United States Patent
Monnier et al.

(10) Patent No.: US 10,237,532 B2
(45) Date of Patent: Mar. 19, 2019

(54) SCAN COLORIZATION WITH AN UNCALIBRATED CAMERA

(71) Applicant: Trimble AB, Danderyd (SE)

(72) Inventors: Fabrice Monnier, Marisons Laffitte (FR); Thomas Chaperon, Nogent-sur-Marne (FR); Guillaume Tremblay, Neuilly Plaisance (FR)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 15/451,834

(22) Filed: Mar. 7, 2017

(65) Prior Publication Data
US 2018/0262737 A1    Sep. 13, 2018

(51) Int. Cl.
| | |
|---|---|
| G06T 7/00 | (2017.01) |
| H04N 13/15 | (2018.01) |
| G06T 19/20 | (2011.01) |
| G06T 7/70 | (2017.01) |
| G06T 7/55 | (2017.01) |
| H04N 13/271 | (2018.01) |

(Continued)

(52) U.S. Cl.
CPC ............ *H04N 13/15* (2018.05); *G06T 7/55* (2017.01); *G06T 7/70* (2017.01); *G06T 15/20* (2013.01); *G06T 19/20* (2013.01); *H04N 13/271* (2018.05); *G06T 2207/10028* (2013.01); *G06T 2207/30244* (2013.01); *H04N 2013/0077* (2013.01); *H04N 2013/0081* (2013.01)

(58) Field of Classification Search
None
See application file for complete search history.

(56) References Cited

U.S. PATENT DOCUMENTS

| 4,967,392 A | 10/1990 | Werner et al. |
| 6,377,265 B1 | 4/2002 | Bong |

(Continued)

FOREIGN PATENT DOCUMENTS

| EP | 3 373 251 A1 | 9/2018 |
| WO | 2012/076757 A1 | 6/2012 |
| WO | 2016/019576 A1 | 2/2016 |

OTHER PUBLICATIONS

Efficient Colorization of Large-Scale Point Cloud Using Multi-pass Z-Ordering. Cho et al., Dec. 2014.*

(Continued)

*Primary Examiner* — Delomia L Gilliard
(74) *Attorney, Agent, or Firm* — Kilpatrick Townsend & Stockton LLP

(57) ABSTRACT

A method of colorizing a 3D point cloud includes receiving the 3D point cloud, receiving a 2D color image acquired by a camera, creating a 2D intensity image of the 3D point cloud based on intrinsic and extrinsic parameters of the camera, generating a set of refined camera parameters by matching the 2D intensity image and the 2D color image, creating a depth buffer for the 3D point cloud using the set of refined camera parameters, determining a foreground depth for each respective pixel of the depth buffer, and coloring the point cloud by, for each respective point of the 3D point cloud: upon determining that the respective point is in the foreground, assigning a color of a corresponding pixel in the 2D color image to the respective point; and upon determining that the respective point is not in the foreground, not assigning any color to the respective point.

22 Claims, 21 Drawing Sheets

(51) Int. Cl.
*G06T 15/20* (2011.01)
*H04N 13/00* (2018.01)

(56) References Cited

U.S. PATENT DOCUMENTS

| | | | |
|---|---|---|---|
| 8,253,729 | B1 | 8/2012 | Geshwind |
| 9,286,680 | B1* | 3/2016 | Jiang ................ G06T 1/0007 |
| 2003/0156122 | A1 | 8/2003 | Donahue et al. |
| 2004/0086175 | A1 | 5/2004 | Parker et al. |
| 2009/0102850 | A1 | 4/2009 | Liang et al. |
| 2010/0302247 | A1 | 12/2010 | Perez et al. |
| 2011/0025689 | A1 | 2/2011 | Perez et al. |
| 2011/0115812 | A1 | 5/2011 | Minear et al. |
| 2011/0238239 | A1 | 9/2011 | Shuler et al. |
| 2012/0307010 | A1 | 12/2012 | Evertt et al. |
| 2013/0268569 | A1 | 10/2013 | Akenine-Moller et al. |
| 2014/0293016 | A1* | 10/2014 | Benhimane ............ G06T 17/00 348/50 |
| 2015/0046456 | A1 | 2/2015 | Hernandez Londono et al. |
| 2015/0104096 | A1 | 4/2015 | Melax et al. |
| 2015/0341552 | A1 | 11/2015 | Chen et al. |
| 2016/0140689 | A1 | 5/2016 | Lux et al. |
| 2016/0148433 | A1 | 5/2016 | Petrovskaya et al. |
| 2016/0283165 | A1 | 9/2016 | Robinson et al. |
| 2016/0335796 | A1 | 11/2016 | Roimela |
| 2017/0039765 | A1 | 2/2017 | Zhou et al. |
| 2017/0124742 | A1 | 5/2017 | Hasselgren et al. |
| 2017/0213315 | A1 | 7/2017 | Chen et al. |
| 2017/0219336 | A1* | 8/2017 | Kurtz ................ G01B 11/03 |
| 2017/0292828 | A1* | 10/2017 | Hillebrand .......... G01B 11/002 |
| 2018/0247447 | A1 | 8/2018 | Serna et al. |

OTHER PUBLICATIONS

U.S. Appl. No. 15/443,804 Non-Final Office Action dated Aug. 14, 2018, 25 pages.
Dahlke, D. et al., "Comparison Between Two Generic 3D Building Reconstruction Approaches—Point Cloud Based Vs. Image Processing Based," The International Archives of the Photogrammetry, Remote Sensing and Spatial Information Sciences, vol. XLI-B3, 2016 XXIII ISPRS Congress, Jul. 12-19, 2016, Prague, Czech Republic, 6 pages.
Extended European Search Report for Application No. 18305240. 6-1210, dated Jul. 11, 2018, 9 pages.
International Search Report and Written Opinion for Application No. PCT/IB2018/051155, dated Jun. 25, 2018, 21 pages.
Tavares, D. L. et al., "Efficient Approximate Visibility of Point Sets on the GPU," 23$^{rd}$ Conference on Graphics, Patterns and Images (SIBGRAPI), Aug. 30, 2010, pp. 239-246.
Lin, W. "Mathematical Morphology and Its Applications on Image Segmentation," Jun. 7, 2000, Dept. of Computer Science and Information Engineering, National Taiwan University, 65 pages.
Invitation to Pay Additional Fees and Partial Search Report for Application No. PCT/IB2018/051155, dated May 4, 2018, 16 pages.
U.S. Appl. No. 15/443,804 Notice of Allowance dated Jul. 5, 2018, 10 pages.
U.S. Appl. No. 15/443,804 Final Office Action dated Jan. 8, 2019, 21 pages.

* cited by examiner

SCAN COLORIZATION WITH AN UNCALIBRATED CAMERA

FIELD OF THE INVENTION

Embodiments described herein relate generally to colorizing three-dimensional (3D) point clouds, and more particularly, to colorizing 3D point clouds acquired by a 3D scanning device using color images acquired by an uncalibrated camera.

BACKGROUND

The acquisition of three-dimensional (3D) point clouds has become an important surveying technique for gathering geospatial information in indoor and outdoor environments. A 3D point cloud may include X, Y, and Z coordinates of a set of points in a 3D coordinate system. These points are often intended to represent the external surfaces of objects. 3D point clouds can be acquired by 3D scanners, stereo vision cameras, time-of-flight lidar systems, and the like.

Thanks to recent improvements in quality and productivity, 3D data are becoming mainstream in many applications, such as urban analysis, building monitoring, industrial modeling, digital terrain generation, forest monitoring, documentation of cultural heritage, among others. Visualizing and inspecting 3D point clouds acquired by 3D scanning devices can be challenging, especially for non-expert users. In order to make these tasks easier, scanning device manufacturers may use photographs to colorize the point clouds. In a colorization process, colors from photographic images are assigned to the corresponding points in a point cloud.

SUMMARY

According to an embodiment of the present invention, a method of colorizing a 3D point cloud includes receiving the 3D point cloud. The 3D point cloud can be acquired by a 3D imaging device positioned at a first location. The 3D point cloud can include 3D coordinates and intensity data for a set of points representing surfaces of one or more objects. The method further includes receiving a 2D color image of the one or more objects acquired by a camera positioned at an approximately known second location and an approximately known orientation. The camera has an approximately known set of intrinsic optical parameter. The method further includes creating a 2D intensity image of the 3D point cloud using the intensity data by projecting the 3D point cloud onto a 2D image area from a view point of the second location based on the set of intrinsic optical parameters, the second location, and the orientation of the camera. The 2D image area can have a size that is the same as the size of the 2D color image. The method further includes generating a set of refined camera parameters for projecting the 3D point cloud onto the 2D image area by matching the 2D intensity image and the 2D color image. The method further includes creating a depth buffer for the 3D point cloud. The depth buffer can have an image area of a size that is the same as the size of the 2D color image and a pixel size that is the same as the pixel size of the 2D color image. The depth buffer includes depth data for the set of points in the 3D point cloud as the set of points are projected onto pixels of the depth buffer using the set of refined camera parameters. The method further includes determining a foreground depth for each respective pixel of the depth buffer by detecting a closest point among a subset of the set of points corresponding to the respective pixel. The method further includes coloring the point cloud by, for each respective point of the set of points: comparing a depth of the respective point with a foreground depth of a corresponding pixel in the depth buffer; upon determining that the depth of the respective point is within a predetermined threshold value from the foreground depth of the corresponding pixel, assigning a color of a corresponding pixel in the 2D color image to the respective point; and upon determining that the depth of the respective point differs from the foreground depth of the corresponding pixel by an amount greater than the predetermined threshold value, not assigning any color to the respective point.

According to another embodiment of the present invention, a method of camera calibration with respect to a 3D imaging device includes receiving a 3D point cloud acquired by the 3D imaging device positioned at a first location. The 3D point cloud can include 3D coordinates and intensity data for a set of points representing surfaces of one or more objects. The method further includes receiving a 2D color image of the one or more objects acquired by a camera positioned at an approximately known second location and an approximately known orientation. The camera can have an approximately known set of intrinsic optical parameters. The method further includes creating a 2D intensity image of the 3D point cloud using the intensity data by projecting the 3D point cloud onto a 2D image area from a view point of the second location based on the set of intrinsic optical parameters of the camera, the second location, and the orientation of the camera. The 2D image area can have a size that is the same as the size of the 2D color image. The method further includes performing image matching between the 2D intensity image and the 2D color image to generate a set of refined camera parameters for projecting the 3D point cloud onto the 2D image area.

According to yet another embodiment of the present invention, a method of camera calibration with respect to a 3D imaging device includes receiving a 3D point cloud acquired by the 3D imaging device. The 3D point cloud can include 3D coordinates and intensity data for a set of points representing surfaces of one or more objects. The method further includes receiving a plurality of two-dimensional (2D) color images of the one or more objects acquired by a camera positioned at a plurality of corresponding locations and a plurality of corresponding orientations. The camera can have an approximately known set of intrinsic optical parameters. The method further includes generating a plurality of sets of refined camera parameters by, for each respective 2D color image of the plurality of 2D color images: creating a respective 2D intensity image of the 3D point cloud using the intensity data by projecting the 3D point cloud onto a 2D image area from a view point of the camera based on a respective location and respective orientation, and the set of intrinsic optical parameters of the camera, the 2D image area having a size that is the same as the size of the 2D color image; and performing image matching between the respective 2D intensity image and the respective 2D color image to generate a respective set of refined camera parameters for projecting the 3D point cloud onto the 2D image area. The method further includes selecting one set of the refined camera parameters from the plurality of sets of refined camera parameters as a final set of refined camera parameters.

According to a further embodiment of the present invention, a method of colorizing a 3D point cloud includes receiving the 3D point cloud. The 3D point cloud can be acquired by a 3D imaging device positioned at a first location. The 3D point cloud can include 3D coordinates for a set of points representing surfaces of one or more objects. The method further includes receiving a 2D color image of the one or more objects acquired by a camera positioned at a second location different from the first location and having an orientation, and receiving a set of camera parameters for projecting the 3D point cloud onto a 2D image area from a view point of the second location. The 2D image area can have a size that is the same as the size of the 2D color image. The method further includes creating a depth buffer for the 3D point cloud. The depth buffer can have an image area of a size that is the same as the size of the 2D color image and a pixel size that is the same as the pixel size of the 2D color image. The depth buffer can include depth data for the set of points in the 3D point cloud as the set of points are projected onto pixels of the depth buffer using the set of camera parameters. The method further includes determining a foreground depth for each respective pixel of the depth buffer by detecting a closest point among a subset of the set of points corresponding to the respective pixel. The method further includes coloring the point cloud by, for each respective point of the set of points: comparing a depth of the respective point with a foreground depth of a corresponding pixel in the depth buffer; upon determining that the depth of the respective point is within a predetermined threshold value from the foreground depth of the corresponding pixel, assigning a color of a corresponding pixel in the 2D color image to the respective point; and upon determining that the depth of the respective point differs from the foreground depth of the corresponding pixel by an amount greater than the predetermined threshold value, not assigning any color to the respective point.

DETAILED DESCRIPTION

Embodiments described herein provide methodologies for colorizing three-dimensional (3D) point clouds acquired by a 3D imaging system using color photographs. More specifically, embodiments of the present invention provide methods for colorizing 3D point clouds acquired by a 3D scanning device using color photographs acquired by an uncalibrated camera positioned at an arbitrary location from the 3D scanning device. In an exemplary embodiment, the methods include algorithms for matching the photographs acquired by the camera with intensity images projected from the 3D point clouds using only approximate camera parameters. Refined camera parameters may be obtained from the matching algorithms. Therefore, prior camera calibration is not required. Embodiments of the present invention also provide an occlusion detection method to avoid colorizing the scan points that are not visible from the camera.

The methodologies may be applied to a variety of setups, including for example a scanning device with a built-in camera, a scanning device with an external camera mounted thereon, a scanning device with a completely separate external camera, and the like.

I. Overview

Some 3D imaging systems, such as laser scanners, measure 3D distances using technologies involving laser beams. For example, in a time-of-flight laser scanner, a laser pulse may be emitted from the laser scanner toward an object and reflected back by the object. The distance from the object to the laser scanner may be determined by measuring the time-of-flight of the light signal from emission to detection.

Figure 1:
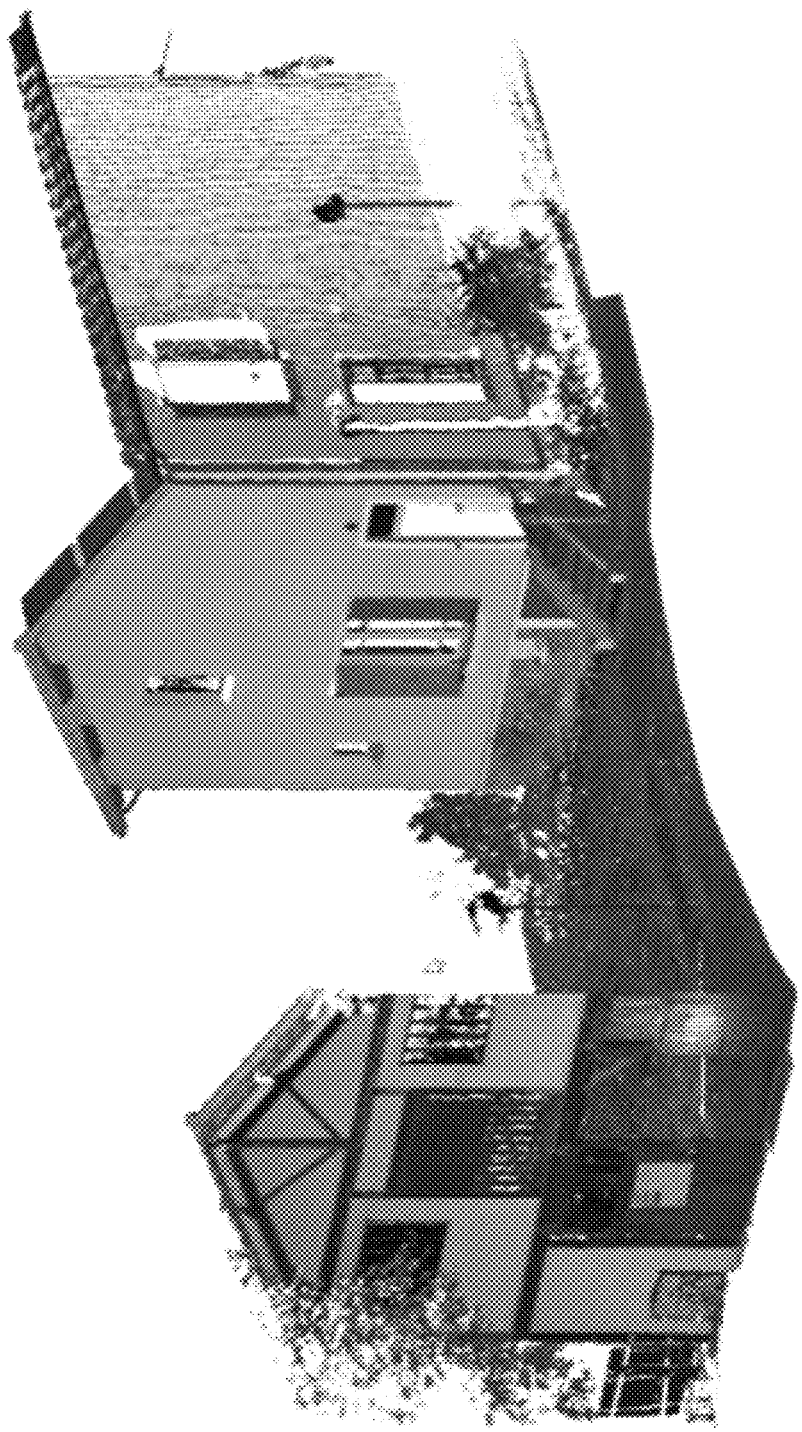
FIG. 1 shows an exemplary rendering of a three-dimensional (3D) point cloud in grayscale.

Along with the range measurement, most laser scanners also acquire a laser intensity value for every point. The intensity value may correspond to the amount of laser light reflected from an object towards the sensor. Therefore, each point generated by a laser scanner may include four values: x, y, and z coordinates and an intensity value. Laser scanners acquire a large number of such points, which forms a point cloud. The x, y, and z coordinates of the points in the point cloud may represent the external surface of an object. The 3D point cloud may be rendered on a display in grayscale using the intensity values. FIG. 1 shows an exemplary rendering of a 3D point cloud in grayscale.

Figure 2:
FIG. 2 shows an exemplary color rendering of the same point cloud rendered in FIG. 1.

To further enhance the visualization and facilitate the scene understanding by the user, the point cloud may be colorized using color information from color images acquired from cameras. FIG. 2 shows an exemplary color rendering of the same point cloud rendered in FIG. 1. Usually, the color images are acquired by cameras that are either located inside or mounted on the scanning device. Conventional colorization approaches may make the following assumptions: (1) the cameras are fully calibrated, i.e., the intrinsic and extrinsic parameters are estimated beforehand, typically using a dedicated environment with specific targets; and/or (2) the camera locations are close to the scanner origin, so that the scan points can be colorized using a simple projection mechanism.

Figure 3:
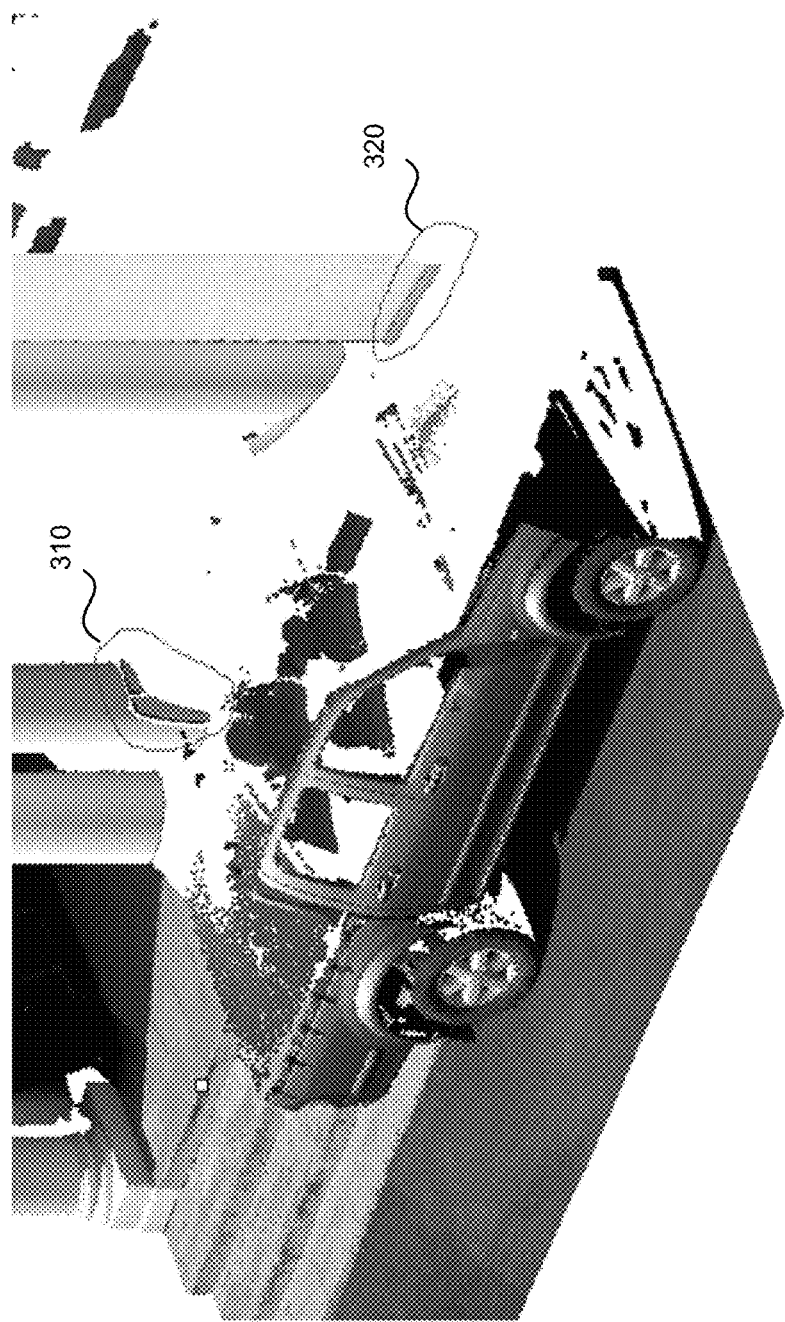
FIG. 3 illustrates some exemplary visual artifacts that can arise where colors are incorrectly assigned to objects.

If the camera location differs significantly from the scanner origin, the objects that are visible to the camera may not be the same as the objects that are visible to the scanner. In such cases, visual artifacts can arise where colors may be incorrectly assigned to certain objects. FIG. 3 illustrates an example of such visual artifacts. In this example, the area 310 on a column and the area 320 on a wall are colorized with the color of a car located in front of the column and the wall.

Figures 4A, 4B, 4C:
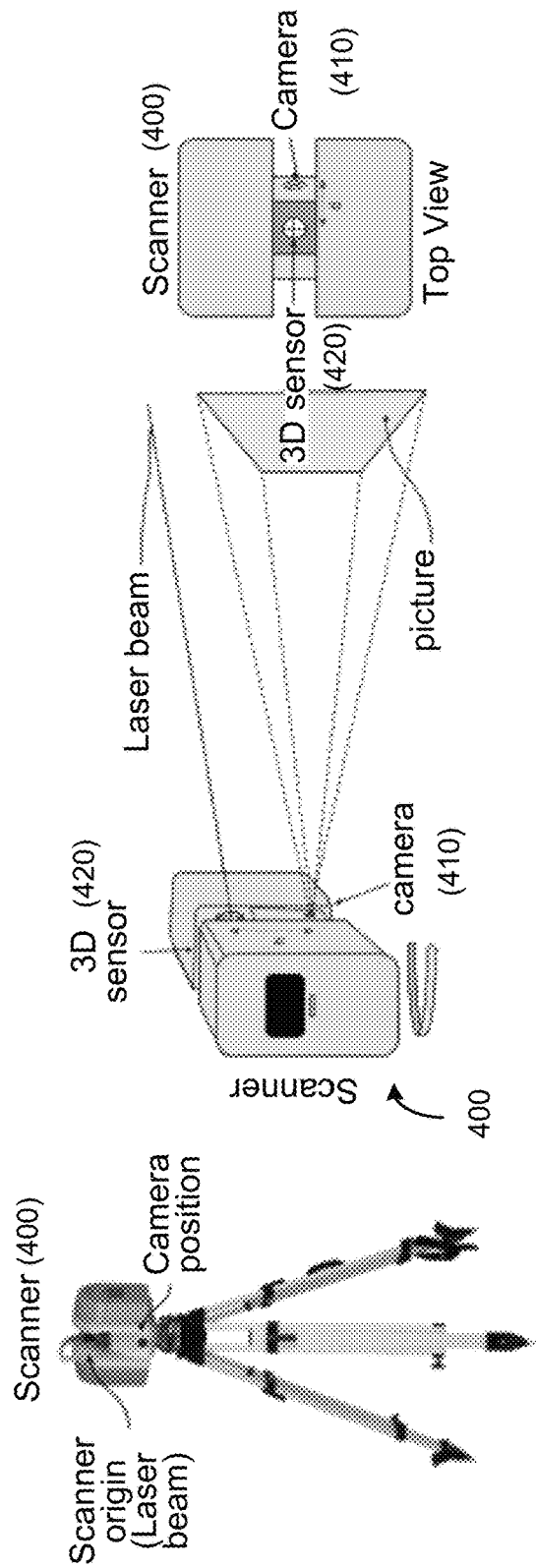
FIGS. 4A-4C show an exemplary scanner with a built-in camera according to an embodiment of the present invention.

Embodiments of the present invention provide methods for colorizing a 3D point cloud acquired by a scanner using color photographs acquired by a camera that is not necessarily positioned close to the scanner origin and whose parameters are only known approximately. In one embodiment, the camera is mounted inside the scanner with a significant parallax. FIGS. 4A-4C show an exemplary scanner 400 with a built-in camera 410 according to an embodiment of the present invention. The scanner 400 includes a 3D sensor 420 that is configured to emit a laser beam toward a scene and detect a return laser beam reflected by an object in the scene. The position of the camera 410 is relatively far away from the scanner origin (i.e., where the laser beam may be emitted from the 3D sensor 420). For example, the camera 410 may be located at about 20 cm from the scan origin. According to an embodiment, only approximate camera parameters are needed for the colorization. The approximate camera parameters may be obtained from computer-aided design (CAD) data for the scanner 400 and the technical sheet of the camera 410 from the camera supplier. One advantage of the colorization method disclosed herein is that the need for a camera calibration during production or servicing of the instrument may be eliminated.

Figure 5:
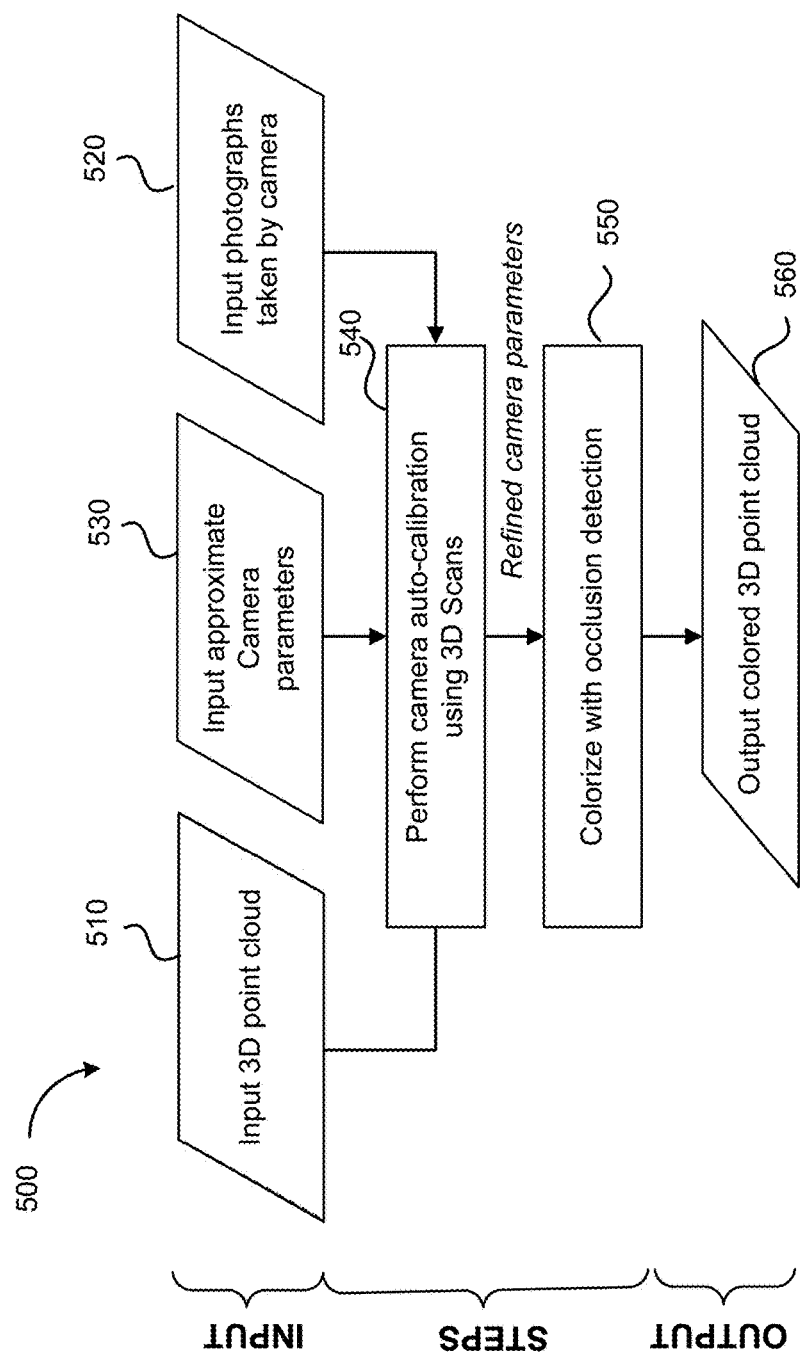
FIG. 5 shows a simplified flowchart illustrating a method of colorizing a 3D point cloud according to an embodiment of the present invention.

FIG. 5 shows a simplified flowchart illustrating a method 500 of colorizing a 3D point cloud according to an embodiment of the present invention. The method 500 includes, at 510, inputting a 3D point cloud acquired by a 3D sensor; at 520, inputting a set of color photographs acquired by a camera; and at 530, inputting approximate camera parameters. The 3D point cloud includes x, y, and z coordinates and intensity values for a set of points. The set of color photographs include images of the same environment as that of the 3D point cloud. As discussed above, the camera used for acquiring the photographs may be located relatively far from the 3D sensor used for acquiring the 3D point cloud. The approximate camera parameters may be obtained from CAD data for the scanner and the technical sheet of the camera.

The method 500 further includes, at 540, performing camera auto-calibration using the 3D point cloud, the photographs, and the approximate camera parameters to obtain refined camera parameters. According to an embodiment, the camera auto-calibration is performed by matching the photographs with the 3D point cloud using only the approximate camera parameters. The method 500 further includes, at 550, colorizing the 3D point cloud using the refined camera parameters. According to an embodiment, colorizing the 3D point cloud is performed using occlusion detection to avoid colorizing the scan points that are not visible from the camera. The method may be applied for any camera position and orientation with respect to the 3D sensor. The method 500 further includes, at 560, outputting the colored 3D point cloud.

Figure 6B:
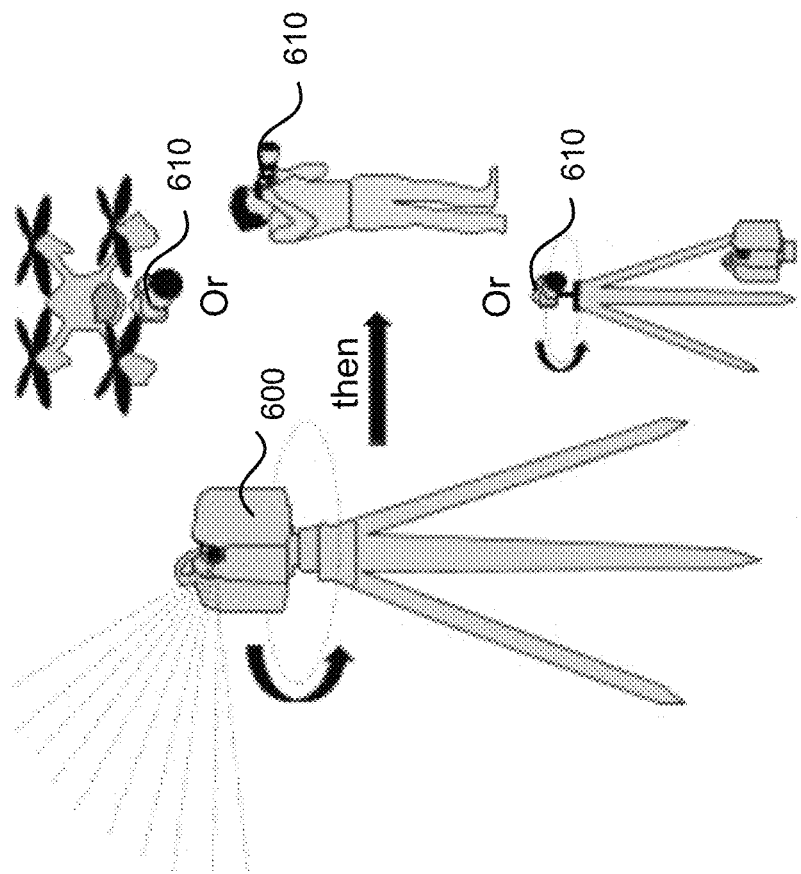
FIGS. 6A and 6B show some exemplar camera arrangements with respect to a scanner according to some embodiments of the present invention.
Figure 6A:
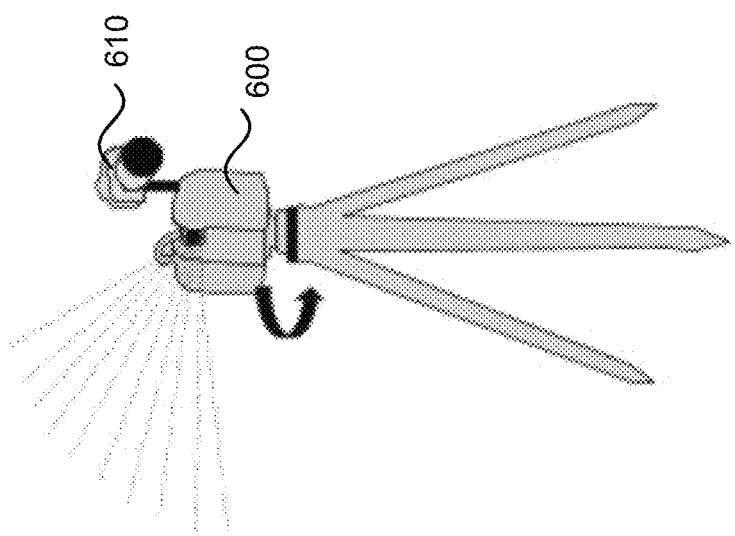

According to one embodiment, the method 500 may be applied to the scanner 400 setup illustrated in FIGS. 4A-4C (e.g., the Trimble TX series scanners). The method 500 may also be applied to other instruments or setups. For example, it may be applied to a handheld or mobile scanner, as well as a terrestrial scanner. The camera can be a built-in camera 410 that is permanently fixed in the scanner, as illustrated in FIGS. 4A-4C, or it can be a separate camera. FIGS. 6A and 6B show some other possible camera arrangements. For example, the camera can be a conventional camera 610 mounted on the scanning device 600, as illustrated in FIG. 6A. The camera can also be a completely separate external camera. For example, the camera 610 can be mounted on a drone, held by a person, or mounted on a separate tripod, as illustrated in FIG. 6B. In cases where the camera 610 is separate from the scanning device 600, the approximate extrinsic camera parameters may be obtained from sensors such as inertial measurement unit (IMU), global navigation satellite system (GNSS) (e.g., the Global Positioning System (GPS)), compass, pressure sensor (for elevation changes), and like. In one embodiment, the camera may be a thermal camera instead of a visible range camera. The camera can also be a panoramic camera in some embodiments.

Figure 7:
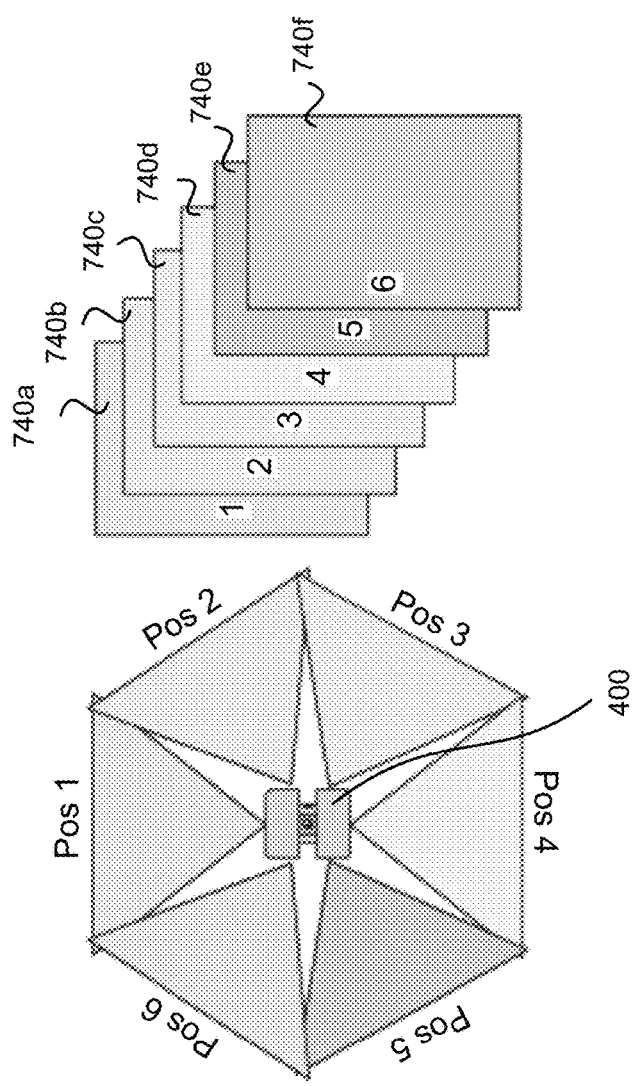
FIG. 7 illustrates schematically an exemplary (e.g., a Trimble TX series) setup for acquiring a 3D point cloud and a set of photographs according to an embodiment of the present invention.

FIG. 7 illustrates schematically an exemplary (e.g., a Trimble TX series) setup according to an embodiment of the present invention. The scanner 400 may be similar to the scanner illustrated in FIG. 4, which includes a built-in camera 410. The scanner 400 may acquire a point cloud. The built-in camera may take a set of color photographs 740a-740f of the same environment at several positions, for example at positions 1-6 in a 360-degree panorama. Camera auto-calibration may be performed in order to project 3D points into corresponding pixel locations in the photographs. Colorization of the 3D point clouds may then be performed by assigning colors in the photographs to the corresponding 3D points. The steps of camera auto-calibration and colorization will be described in more detail below.

II. Camera Auto-Calibration

In order to accurately project 3D points of a 3D point cloud into corresponding pixel locations in the photographs, a set of camera parameters needs to be estimated. According to embodiments of the present invention, approximate intrinsic camera parameters, such as focal length, optical center, principal point, and distortion parameters, and the approximate extrinsic camera parameters, such as the camera position and orientation (e.g., the viewing direction in terms of up-down direction and left-right direction) may be used as a starting point. A set of refined camera parameters are then estimated based on a given 3D point cloud and a set of photographs of the same environment using the approximate camera parameters. This process may be referred herein as auto-calibration because it is similar to a camera calibration step but does not require a dedicated environment with specific targets to be scanned and photographed.

Figure 8:
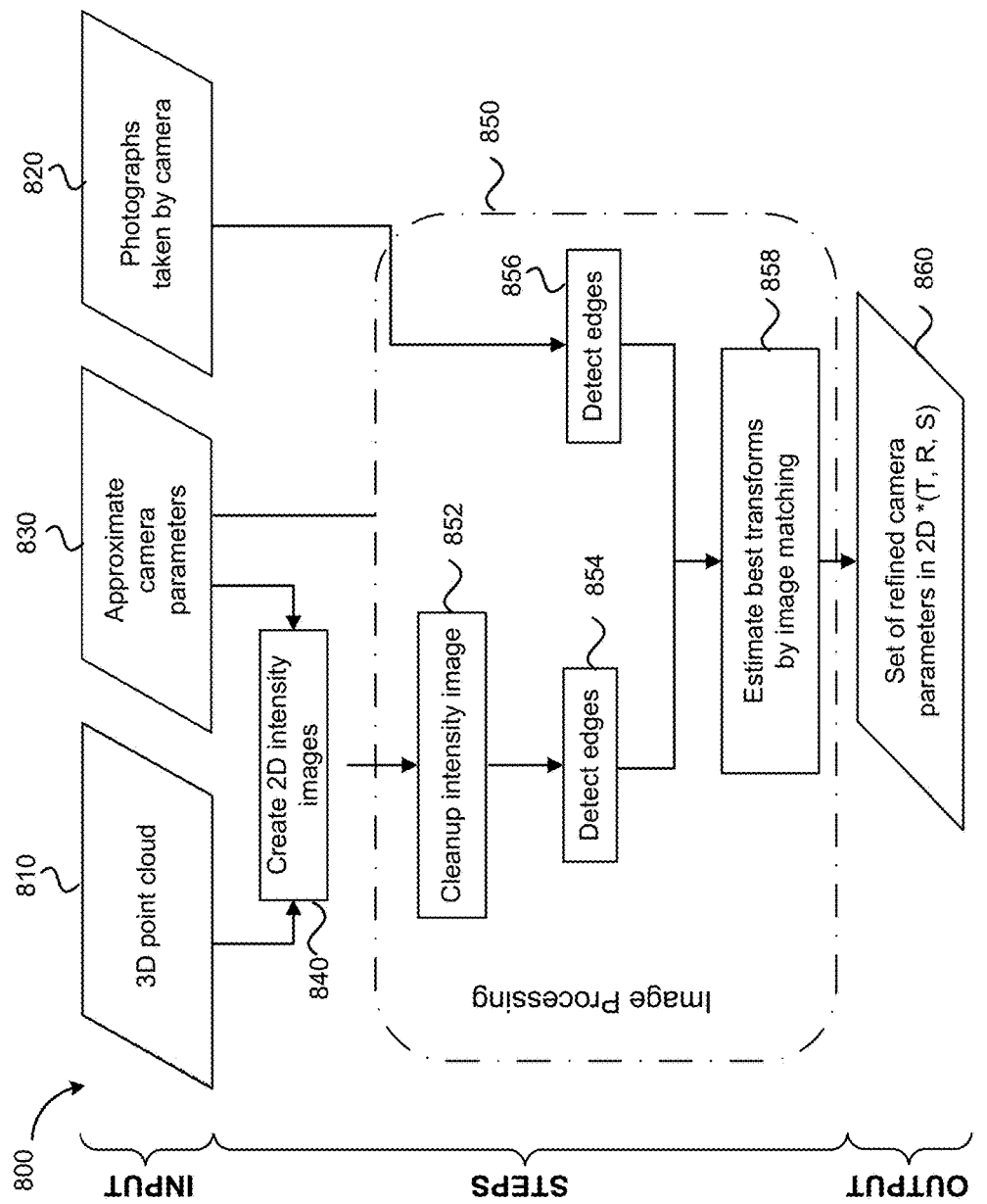
FIG. 8 shows a simplified flowchart illustrating a method of camera auto-calibration according to an embodiment of the present invention.

FIG. 8 shows a simplified flowchart illustrating a method 800 of camera auto-calibration according to an embodiment of the present invention. The method 800 is based on image processing techniques. The input includes a 3D point cloud with intensity data (810), a set of photographs of the same environment taken by a camera (820), and a set of approximate camera parameters (830) (including intrinsic and extrinsic camera parameters). The processing steps include creating intensity images from the 3D point cloud using the approximate camera parameters (840), and performing image processing to match the intensity images with the photographs (850). The output is a set of refined camera parameters (860). The processing steps 840 and 850 are described in more detail below.

Still referring to FIG. 8, the method 800 includes creating 2D intensity images from the 3D point cloud using the set of approximate camera parameters (840). The set of approximate camera parameters includes intrinsic and extrinsic parameters needed to define a camera projection. The intrinsic camera parameters may include the focal length of the camera lens in pixels or mm (in which case the pixel size in mm is needed), the optical center and the principal point of the camera lens, and the distortion model and associated parameters of the camera lens. The extrinsic camera parameters may include the position and orientation of the camera with respect to the scanner coordinate frame corresponding to the acquisition condition of each photograph. The output may include a set of refined camera parameters, which may be used to obtain accurate 2D projections of the 3D point cloud onto the pixels of each photograph.

Figure 9:
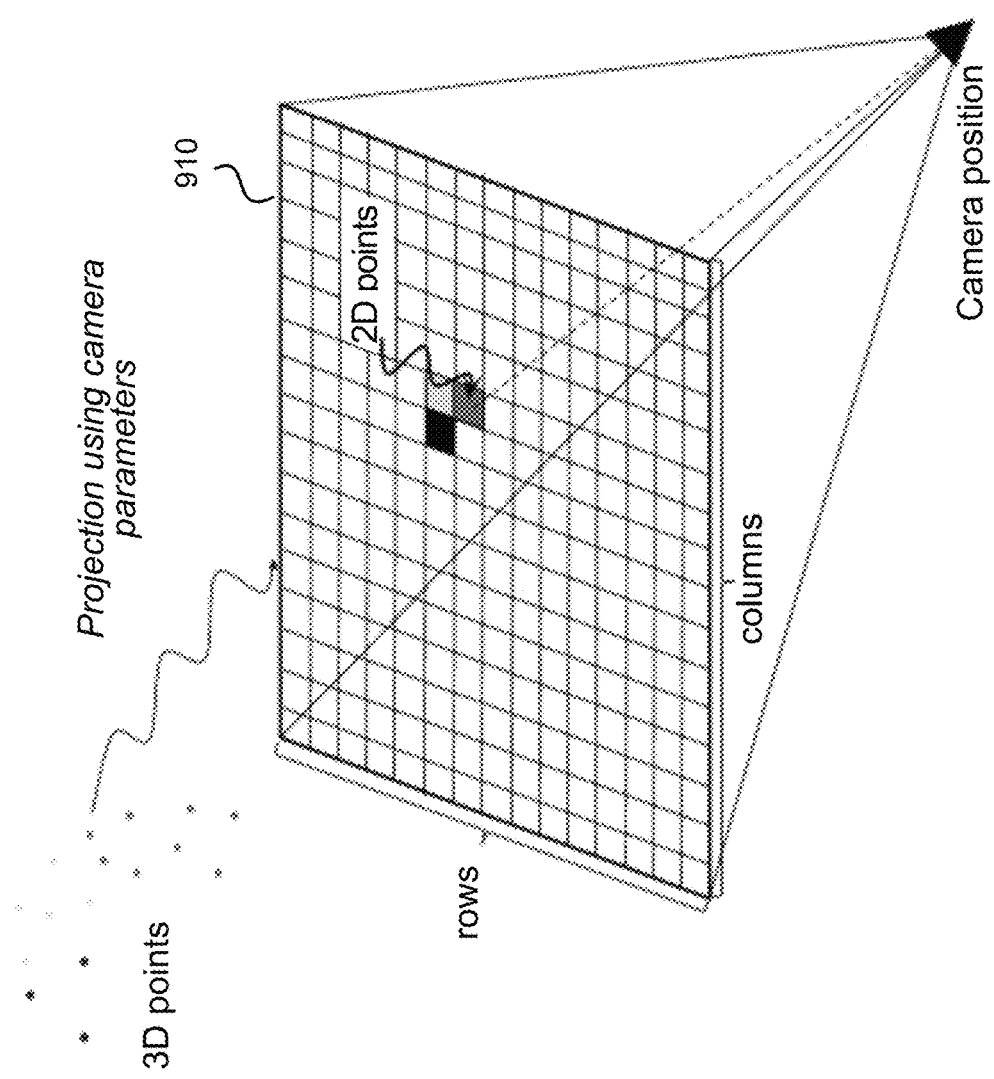
FIG. 9 illustrates schematically the projection of a 3D point cloud onto a 2D intensity image according to an embodiment of the present invention.
Figures 10A, 10B:
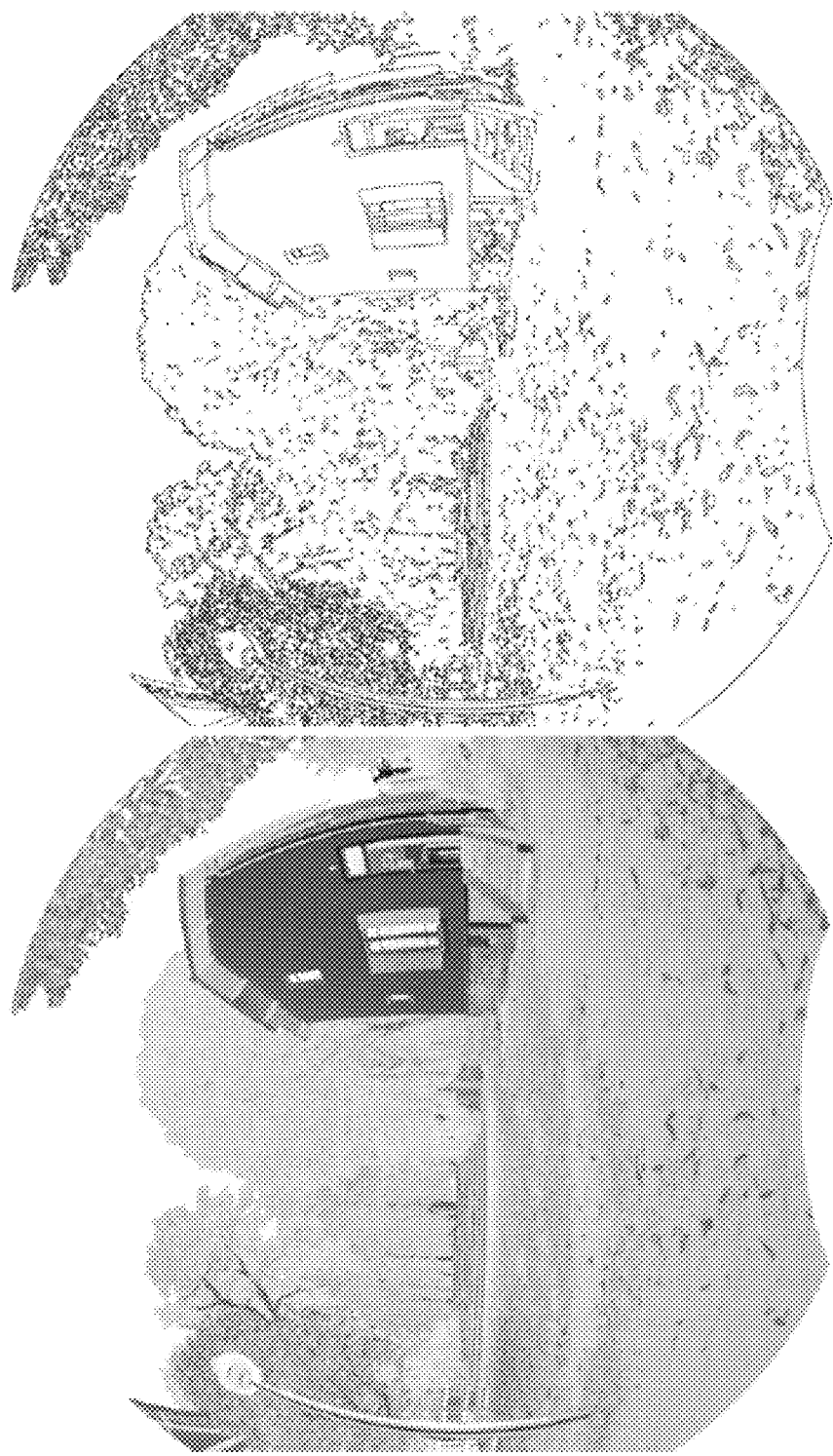
FIG. 10A shows an exemplary intensity image in grey scale projected from a 3D point cloud according to an embodiment of the present invention.
FIG. 10B shows an edge image created from the 2D intensity image shown in FIG. 10A according to an embodiment of the present invention.

In some embodiments, the 3D point cloud may be projected onto a 2D intensity image having the same size as a corresponding photograph from the viewpoint of the camera position when the photograph is taken. FIG. 9 illustrates schematically the projection of a 3D point cloud onto a 2D intensity image 910 according to an embodiment of the present invention. Using the approximate camera parameters, each point of the 3D point cloud is projected onto a corresponding pixel in the 2D image 910. The intensity of the corresponding pixel in the 2D image 910 is the laser intensity of the respective 3D point. In cases where more than one 3D points are projected onto the same pixel, the intensity of the that pixel is the laser intensity of the point that is closest to the camera position. According to an embodiment, this is achieved by computing two images of equal size, one for the intensity and one for the depth. The depth image includes depth information of each point in the 3D point cloud with respect to the camera position. FIG. 10A shows an exemplary intensity image in grey scale projected from a 3D point cloud according to an embodiment of the present invention.

Still referring to FIG. 8, the method includes, at 850, performing image processing to obtain a set of refined camera parameters (860). The set of refined camera parameters may include 2D translation (T), 2D rotation (R), and 2D scaling (S) parameters for projecting the 3D point cloud accurately to a 2D image corresponding to a photograph.

Figure 11B:
FIG. 11B shows an edge image created from the photograph shown in FIG. 11A according to an embodiment of the present invention.
Figure 11A:
FIG. 11A shows a photograph of the same environment as that of the 3D point cloud illustrated in FIG. 10A.

According to an embodiment, image matching may be performed by iterative matching of edges using a template matching algorithm. Thus, image processing may include, at 854, detecting a set of edges in a 2D intensity image, and at 856 detecting a set of edges in a corresponding photograph. Edges may be detected by computing the gradients and applying thresholding on the magnitudes of the gradients. For better results, the 2D intensity image may be cleaned up before edge detection (852). For example, a smoothing operation may be performed on the 2D intensity image before computing the gradients. The edge detection algorithm may produce two images, which may be referred to as edge images. FIG. 10B shows an edge image created from the 2D intensity image shown in FIG. 10A according to an embodiment. FIG. 11A shows a photograph of the same scene. FIG. 11B shows an edge image created from the photograph shown in FIG. 11A according to an embodiment of the present invention.

Figure 12:
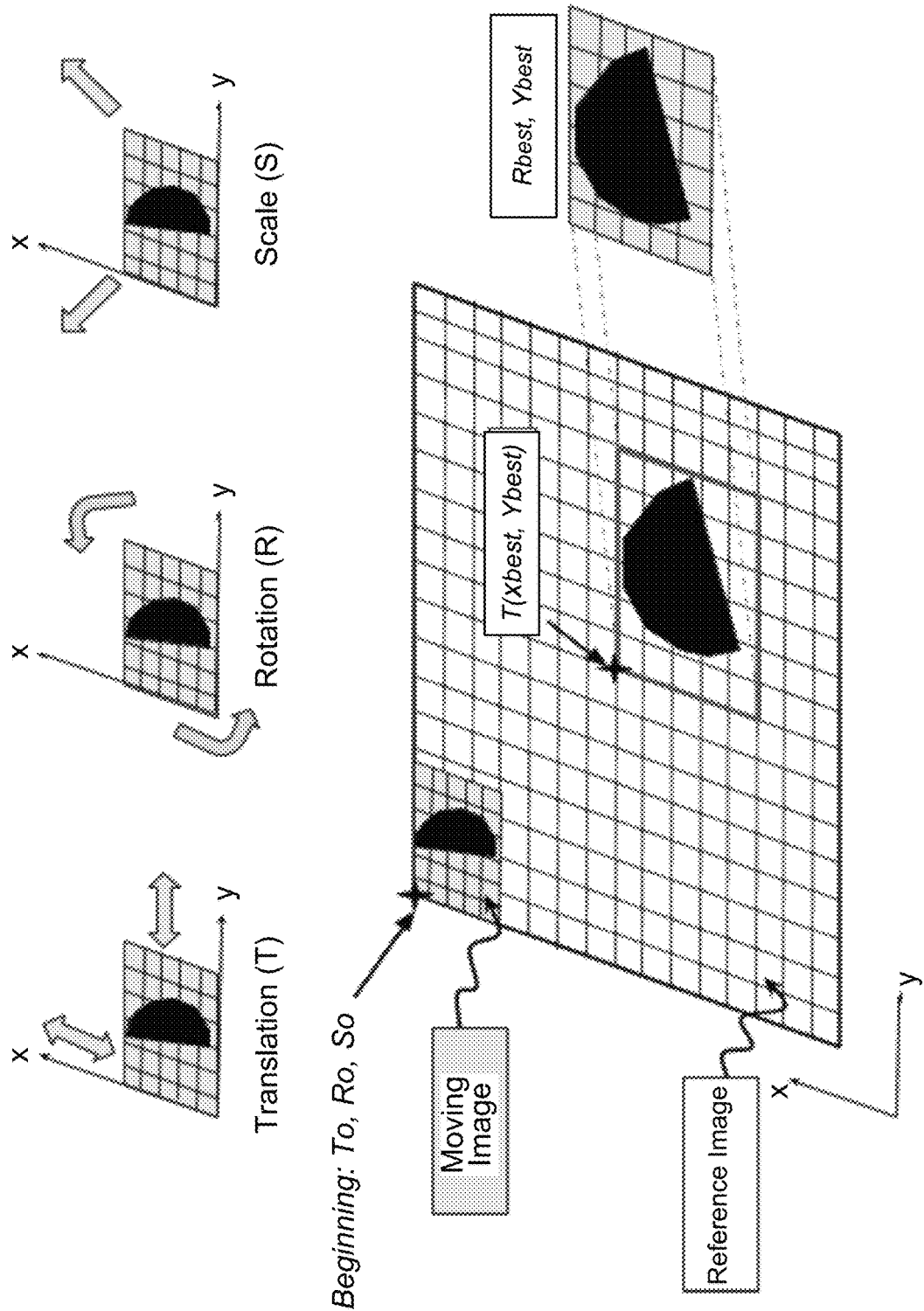
FIG. 12 illustrates schematically an algorithm to estimate a best set of 2D translation, 2D rotation, and 2D scaling parameters that can match an edge image created from a 2D intensity image and an edge image created from a photograph according to an embodiment of the present invention.

Still referring to FIG. 8, a set of transformation parameters, including 2D translation (T), 2D rotation (R), and 2D scaling (S) parameters, may be estimated by matching the two edge images (858). FIG. 12 illustrates schematically an algorithm to estimate a best set of 2D translation, 2D rotation, and 2D scaling parameters that can match the edge image created from the 2D intensity image and the edge image created from the photograph according to an embodiment of the present invention. The algorithm may iteratively test every pair of 2D rotation and 2D scaling values, in a given range with a given step for each of the rotation and scaling. For each candidate pair of rotation and scaling values, the algorithm may find the best translation value using a template matching algorithm on the edge images, along with an associated score. In one embodiment, the template matching algorithm uses Fourier transform, and the computed score is the cross-correlation score between the two images.

In one embodiment, the candidate pair of rotation and scaling values that gives the best score is kept. This may yield a set of final correction parameters for rotation, scaling, and translation that can be applied every time for converting the 3D coordinates of each point in the 3D point cloud to a corresponding pixel location on the image, or vice versa (provided that the relative position of the camera with respect to the 3D scanner is fixed). In this manner, a set of refined camera parameters, including the 2D translation, 2D rotation, and 2D scaling parameters, may be obtained without having to modify the approximate camera parameters themselves.

In some embodiments, instead of keeping only the best solution, N best solutions may be kept. Several photographs, e.g., M photographs, taken by the same camera may be used to obtain a total of N×M best solutions. For example, as illustrated schematically in FIG. 7, multiple photographs may be taken by the same camera. Because there might be some issues in some images (e.g., due to moving objects, exposure issues, and the like), it may be more robust to estimate the refined camera parameters using all the images.

Figure 13:
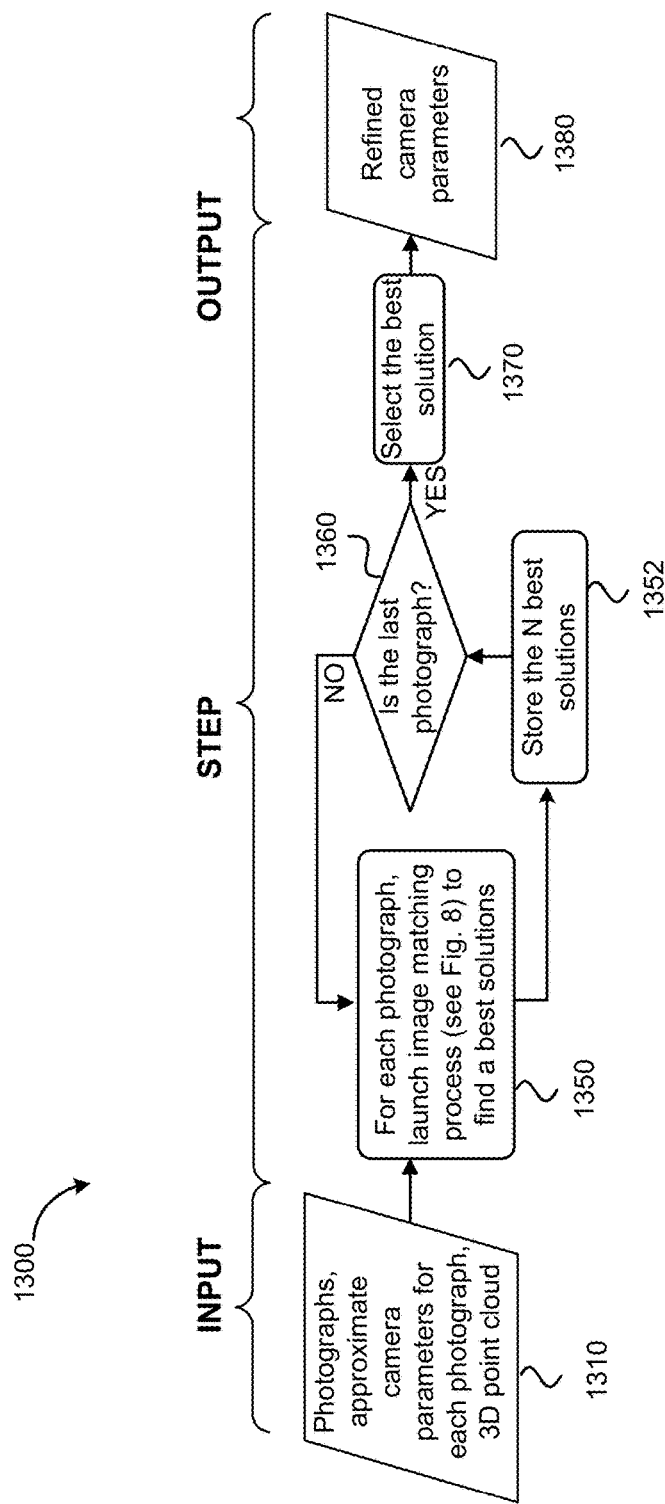
FIG. 13 shows a simplified flowchart illustrating a method of estimating a set of refined camera parameters using multiple photographs according to an embodiment of the present invention.

FIG. 13 shows a simplified flowchart illustrating a method 1300 of estimating a set of refined camera parameters using multiple photographs according to an embodiment of the present invention. The input are a 3D point cloud, multiple photographs (e.g., M photographs), and approximate camera parameters for each photograph (1310). For each photograph, image matching may be performed to obtain N best solutions for the refined camera parameters (1350), using for example the method 800 as illustrated in FIG. 8. The N best solution for each photograph are stored (1352). The method 1300 then determines whether it is the last photograph (1360). If it is not the last photograph, the method 1300 proceeds to perform image matching for the next photograph to obtain another set of N best solutions, until image matching has been performed for all photographs.

The process may produce a total of N×M best solutions for the set of refined camera parameters (1352). The method 1300 may then select a best solution among the N×M best solutions (1370). In one embodiment, a clustering algorithm may be used to select a best solution among the N×M best solutions. For example, the N×M best solutions may be plotted as data points in a parameter space. One or more clusters that include groups of data points with small distances among the cluster members may be identified. A solution among the most dense cluster may be selected as the final best solution. The selected best solution produces the final refined camera parameters (1380).

According to another embodiment, a set of camera parameters may be directly estimated without estimating the 2D translation, 2D rotation, and 2D scaling parameters. For example, an intensity image may be created from the 3D point cloud for each set of candidate camera parameters. An edge image may be computed for the 2D intensity image. A corresponding edge image may be computed for a corresponding photograph. The best set of camera parameters would be the ones that maximize a cross-correlation score between the two edge images.

According to some other embodiments, instead of matching edges, other image matching techniques may be used. For example, a set of features may be extracted from an intensity image and another set of features may be extracted from a corresponding color photograph. A set of refined camera parameters may be estimated by matching the two sets of features.

In some further embodiments, a setup may include multiple cameras. A set of refined camera parameters may be estimated for each camera.

III. Colorization With Occlusion Detection

Having obtained a set of refined camera parameters using the camera auto-calibration process described above, the 3D point cloud may be accurately projected onto a 2D image area having the same size as a corresponding photograph. The 3D point cloud may then be colorized by assigning the colors in the paragraph to the corresponding points in the 3D point cloud. In other words, the color of each pixel in the photograph may be assigned to the 3D points projected to the same pixel.

Figure 14:
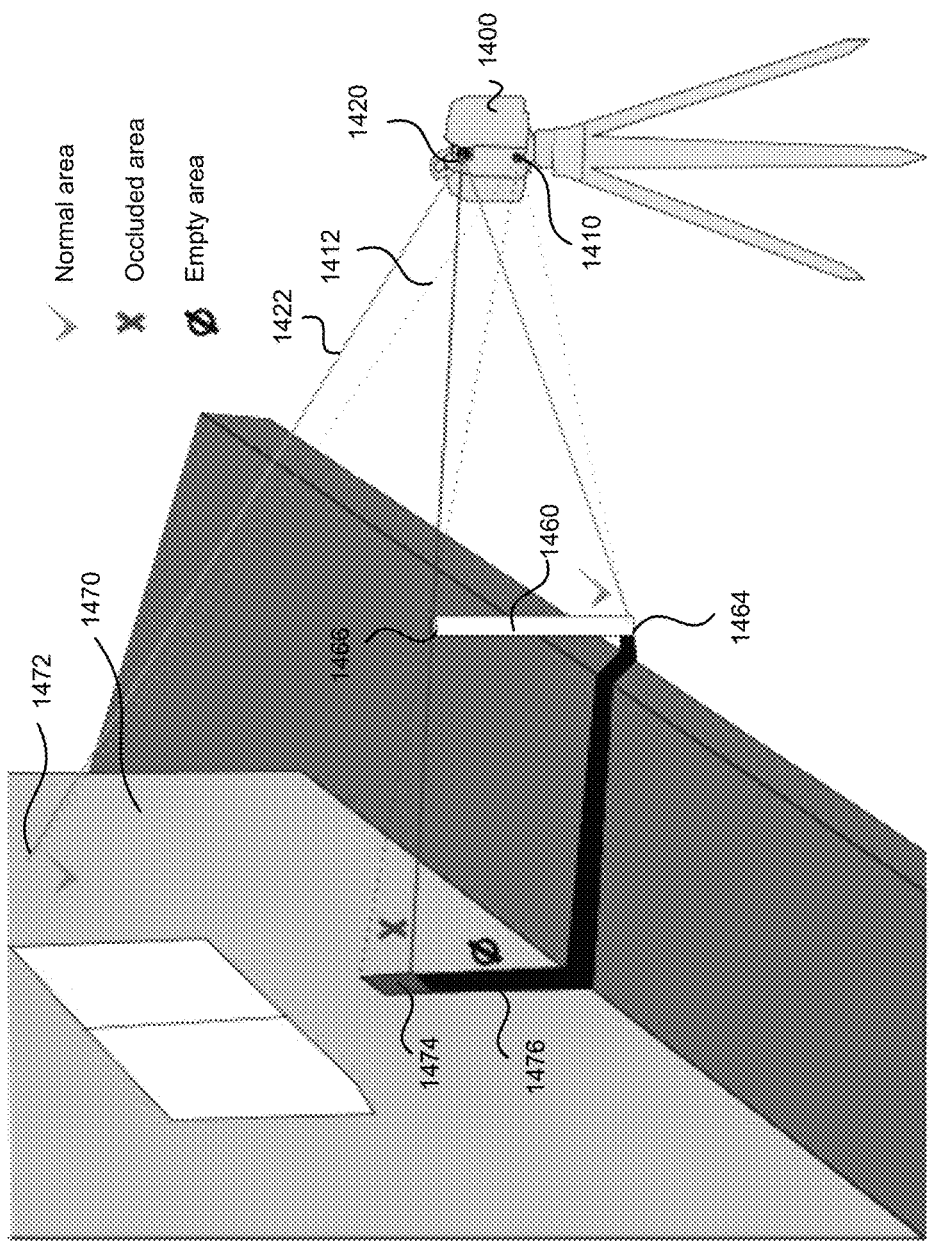
FIG. 14 illustrates schematically how occlusion may arise in an exemplary setup.

Since there is no assumption that the camera location is the same as the scanner origin, certain parts of the scene may be visible in the point cloud but not in the photograph taken by the camera. FIG. 14 illustrates schematically how this situation may arise in an exemplary setup. The setup includes a scanner 1400 with a built-in camera 1410 that is positioned at certain distance below the scanner origin 1420. The scene includes a house 1470 and a post 1460 located in front of the house 1470. The solid line 1422 indicates a line of sight from the scanner origin 1420 to the area 1472 on the house 1470. The dashed line 1412 indicates a line of sight from the camera 1410 to the same area 1472 on the house 1470. Thus, the area 1472 is visible to both the scanner 1400 and the camera 1410 simultaneously. Therefore, the area 1472 in the 3D point cloud may be assigned the color at a corresponding pixel location in a photograph taken by the camera 1410. Similarly, the area 1464 at the bottom of the post 1460 is visible to both the scanner 1400 and the camera 1410 simultaneously, and therefore the area 1464 in the 3D point cloud may be assigned the color at a corresponding pixel location in a photograph taken by the camera 1410. Areas such as the areas 1472 and 1464 may be referred herein as "normal" areas.

On the other hand, the area 1474 on the house 1470 is visible to the scanner 1400 but not visible to the camera 1410, because the view of that area is obstructed from the camera 1410 by the post 1460 in the front. Therefore, the points in the point cloud corresponding to the area 1474 should not be assigned the colors at the corresponding pixel locations in the photograph, because doing so may resulting in assigning the colors of the post 1460 to those points representing the wall of the house 1470. Areas such as the area 1474 may be referred herein as "occluded" areas. Colorizing the occluded areas may result in visual artifact by assigning the color of the foreground object to the occluded area in the background.

The area 1476 on the house 1470 is visible to neither the scanner 1400 nor the camera 1410, because it's view is obstructed from both the scanner 1400 and the camera 1410 by the post 1460. Areas like the area 1476 may be referred herein as "empty" areas.

Figure 15:
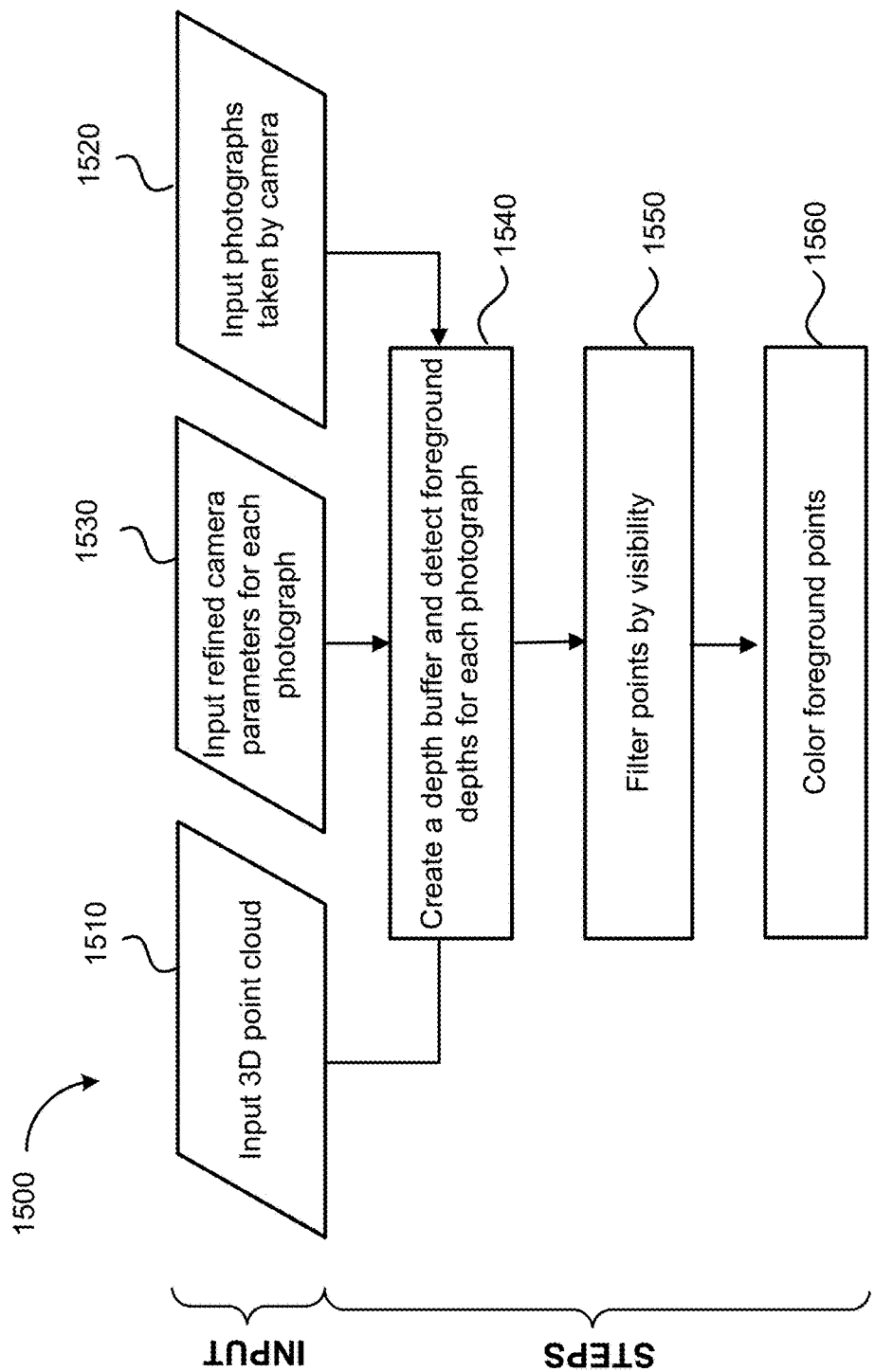
FIG. 15 shows a simplified flowchart illustrating a method of occlusion detection according to an embodiment of the present invention.

To avoid colorizing occluded points, embodiments of the present invention apply an occlusion detection method to detect the occluded points with respect to a given photograph. FIG. 15 shows a simplified flowchart illustrating a method 1500 of occlusion detection according to an embodiment of the present invention. The input includes a 3D point cloud (1510), a set of photographs of the same environment (1520), and a set of refined camera parameters for each photograph (1530). The refined camera parameters may be obtained by the method 800 discussed above in relation to FIG. 8. The processing steps may include: creating a depth buffer and detecting foreground depths for each photograph (1540); filtering points by visibility (1550) (e.g., filtering out background points); and coloring the foreground points (1560). The steps of depth buffer creation and foreground depths detection (1540), and points filtering by visibility (1550) are described in more detail below.

For a given photograph, a depth buffer may be created for the 3D point cloud. The depth buffer may have a pixel size that is the same as that of the photograph. The 3D point cloud may be projected onto the depth buffer from the viewpoint of the camera when the photograph is taken using the set of the refined camera parameters for the photograph. For each pixel, a foreground depth value, i.e., the depth of the closest point among those points that are projected onto this specific pixel, may be detected and stored.

Figure 16:
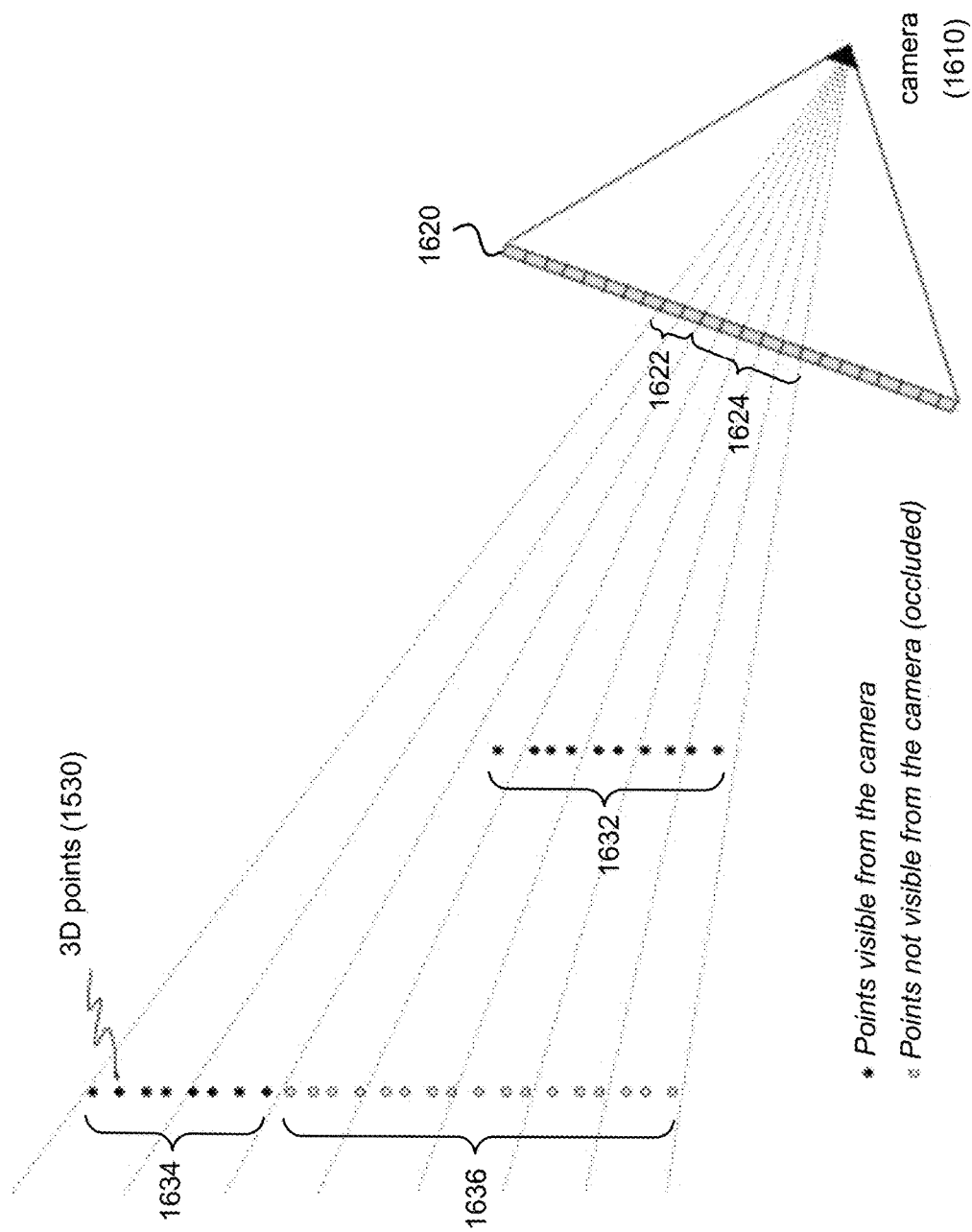
FIG. 16 illustrates schematically how occlusion detection may be applied to a 3D point cloud according to an embodiment of the present invention.

FIG. 16 illustrates schematically how the foreground depths may be detected according to an embodiment of the present invention. For example, the group of points 1634 are projected onto the pixels 1622 of the depth buffer 1620. Since these points are closest to the camera 1610 among the points that are projected onto the pixels 1622, their depths represent the foreground depths for the pixels 1622. The group of points 1636, as well as the group of points 1632, are projected onto the pixels 1624 of the depth buffer 1620. Because the group of points 1632 are closest to the camera 1610 among the points that are projected onto the pixels 1624, their depths represent the foreground depths for the pixels 1624.

According to an embodiment, point filtering may be performed to remove background points from the depth buffer, i.e., to remove those points that are occluded from view by the foreground points and thus are not visible to the camera. The remaining points are then colored using the colors in the photograph.

Occlusion detection may be performed by, for each point in the 3D point cloud, comparing its depth to the foreground depth value for the corresponding pixel. A threshold value may be used in the occlusion detection. For example, the method may determine a difference between the depth of the respective point and the foreground depth of the corresponding pixel. If the difference is greater than a predetermined threshold value, it may be determined that the respect point is occluded. Accordingly, the respective point may be removed from the depth buffer. Conversely, if the difference is less than the predetermined threshold value, it may be determined that the respect point is in the foreground. Accordingly, the respective point is kept. In some embodiments, the threshold value may be dependent on the distance from the camera position.

For instance, in the example illustrated in FIG. 16, it may be determined that the group of points 1636 are occluded. Thus, those points are removed. On the other hand, it may be determined that the group of points 1634 and the group of points 1632 are in the foreground. Thus, those points are kept, and are colored using the colors of the photograph.

In some embodiments, image processing techniques, such as mathematical morphology algorithms, may be applied to the depth buffer to filter out the background points. For example, closing operations of the mathematical morphology methodology may be performed on the depth buffer to remove background points. Isolated points may also be removed from the depth buffer.

Since the camera location for one photograph may be different from the camera location for another photograph, a given 3D point may belong to an occluded area in one photograph and be visible in another photograph. To colorize as many points as possible, the method may handle a whole set of photographs in one process, referred herein as "full workflow," according to some embodiments.

Figure 17:
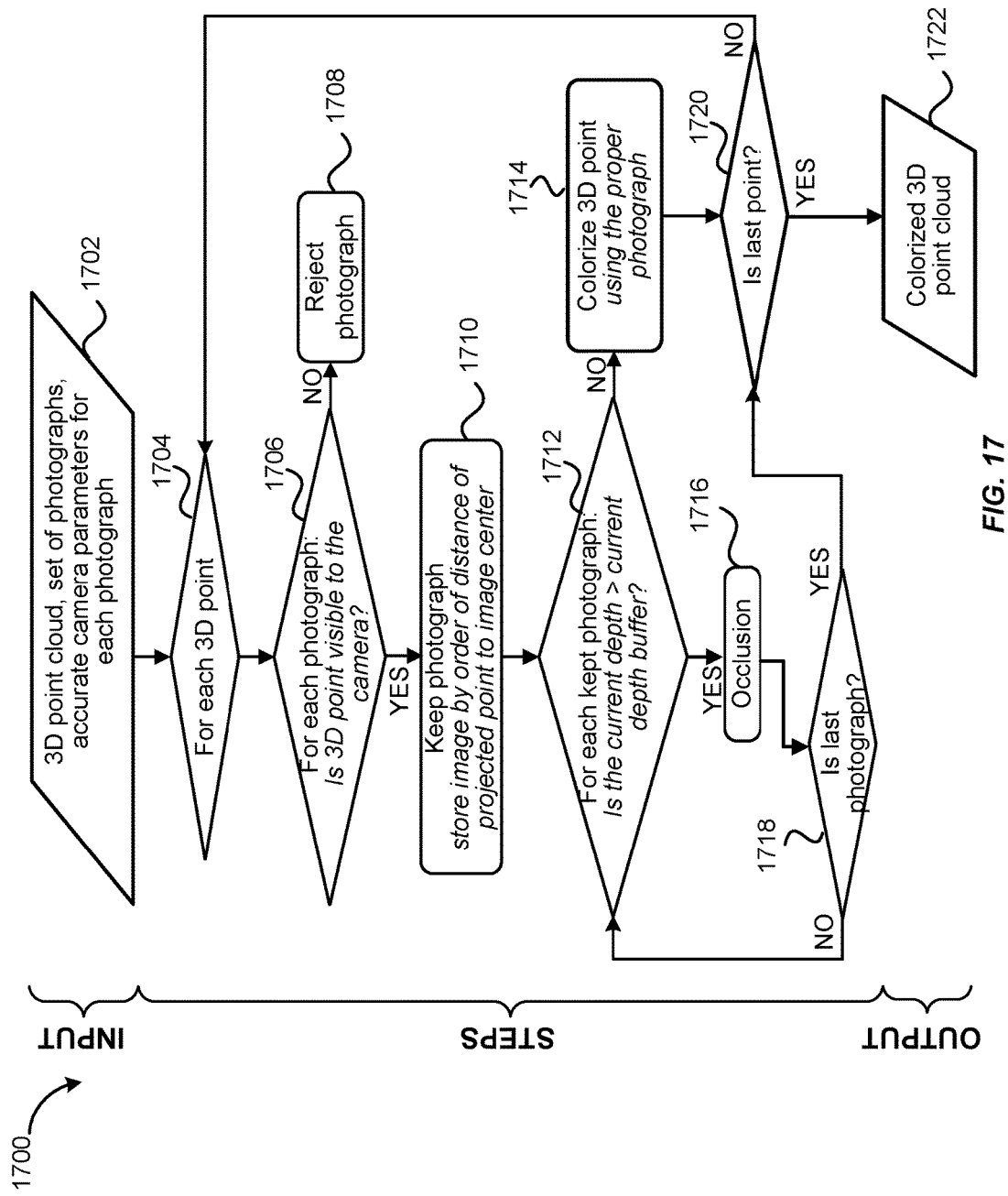
FIG. 17 shows a simplified flowchart illustrating a method of colorizing a 3D point cloud using multiple photographs according to an embodiment of the present invention.

FIG. 17 shows a simplified flowchart illustrating a method 1700 of colorizing a 3D point cloud using multiple photographs according to an embodiment of the present invention. The input includes a 3D point cloud, a set of photographs, and a set of refined camera parameters for each photograph (1702). The set of refined camera parameters may be obtained by the method 800 discussed above in relation to FIG. 8.

The method 1700 includes, for each 3D point (1704), for each respective photograph, determining whether the 3D point is visible to the camera as the respective photograph is taken (1706). If it is determined that the 3D point is not visible to the camera, the respective photograph is rejected (1708). If it is determined that the 3D point is visible to the camera, the respective photograph is kept (1710). If more than one photograph is kept, the photographs may be stored by the order of distances from the 3D point to the camera.

For each respective photograph that is kept, it may be determined whether the depth of the 3D point is greater than the depth of the corresponding pixel in the current depth buffer (1712). A threshold value may be used as described above. If it is determined that the depth of the 3D point is not greater than the depth of the corresponding pixel in the current depth buffer, the 3D point is colorized using the color of the corresponding pixel in the respective photograph (1714). It is then determined whether the 3D point is the last point (1720). If it is determined that it is not the last point, the method proceeds to a next 3D point. If it is determined that the 3D point is the last point, a colorized 3D point cloud is output (1722).

If it is determined that the depth of the 3D point is greater than the depth of the corresponding pixel in the current depth buffer, the 3D point is not colorized (i.e., occluded) (1716). It is then determined whether it is the last kept photograph (1718). If it is determined that it is the last kept photograph, the method proceeds to determine if it is the last point (1720). If it is determined that is not the last photograph, the method proceeds to the next kept photograph until all kept photographs have been processed.

Figure 18:
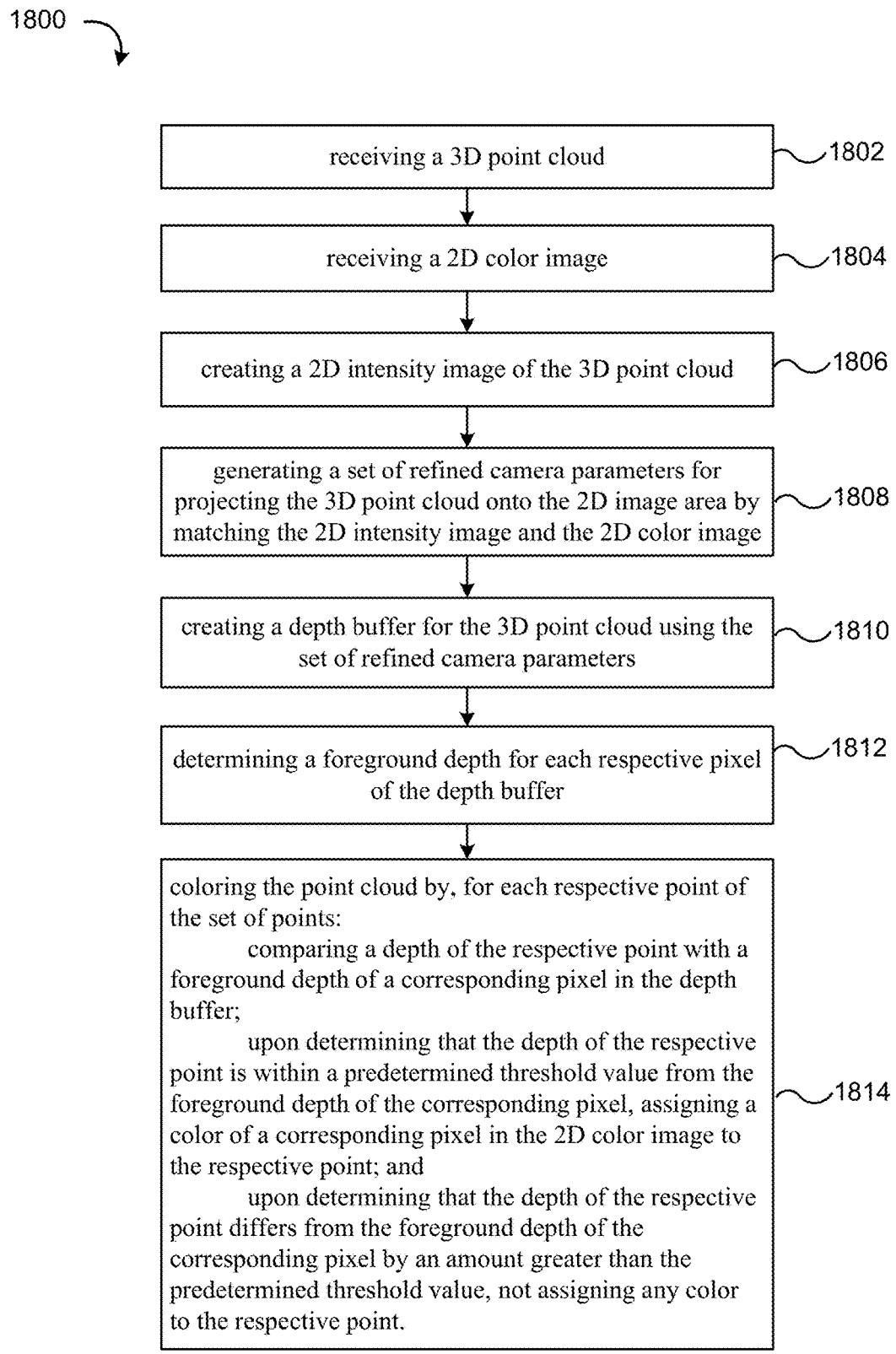
FIG. 18 shows a simplified flowchart illustrating a method of colorizing a 3D point cloud according to an embodiment of the present invention.

FIG. 18 shows a simplified flowchart illustrating a method 1800 of colorizing a 3D point cloud according to an embodiment of the present invention. The method 1800 includes, at 1802, receiving the 3D point cloud. The 3D point cloud can be acquired by a 3D imaging device positioned at a first location. The 3D point cloud can include 3D coordinates and intensity data for a set of points representing surfaces of one or more objects. The method 1800 further includes, at 1804, receiving a 2D color image of the one or more objects acquired by a camera positioned at an approximately known second location and an approximately known orientation. The camera has an approximately known set of intrinsic optical parameter.

The method 1800 further includes, at 1806, creating a 2D intensity image of the 3D point cloud using the intensity data by projecting the 3D point cloud onto a 2D image area from a view point of the second location based on the set of intrinsic optical parameters, the second location, and the orientation of the camera. The 2D image area can have a size that is the same as the size of the 2D color image. The method 1800 further includes, at 1808, generating a set of refined camera parameters for projecting the 3D point cloud onto the 2D image area by matching the 2D intensity image and the 2D color image.

The method 1800 further includes, at 1810, creating a depth buffer for the 3D point cloud. The depth buffer can have an image area of a size that is the same as the size of the 2D color image and a pixel size that is the same as the pixel size of the 2D color image. The depth buffer includes depth data for the set of points in the 3D point cloud as the set of points are projected onto pixels of the depth buffer using the set of refined camera parameters. The method 1800 further includes, at 1812, determining a foreground depth for each respective pixel of the depth buffer by detecting a closest point among a subset of the set of points corresponding to the respective pixel.

The method 1800 further includes, at 1814, coloring the point cloud by, for each respective point of the set of points: comparing a depth of the respective point with a foreground depth of a corresponding pixel in the depth buffer; upon determining that the depth of the respective point is within a predetermined threshold value from the foreground depth of the corresponding pixel, assigning a color of a corresponding pixel in the 2D color image to the respective point; and upon determining that the depth of the respective point differs from the foreground depth of the corresponding pixel by an amount greater than the predetermined threshold value, not assigning any color to the respective point.

Figure 19:
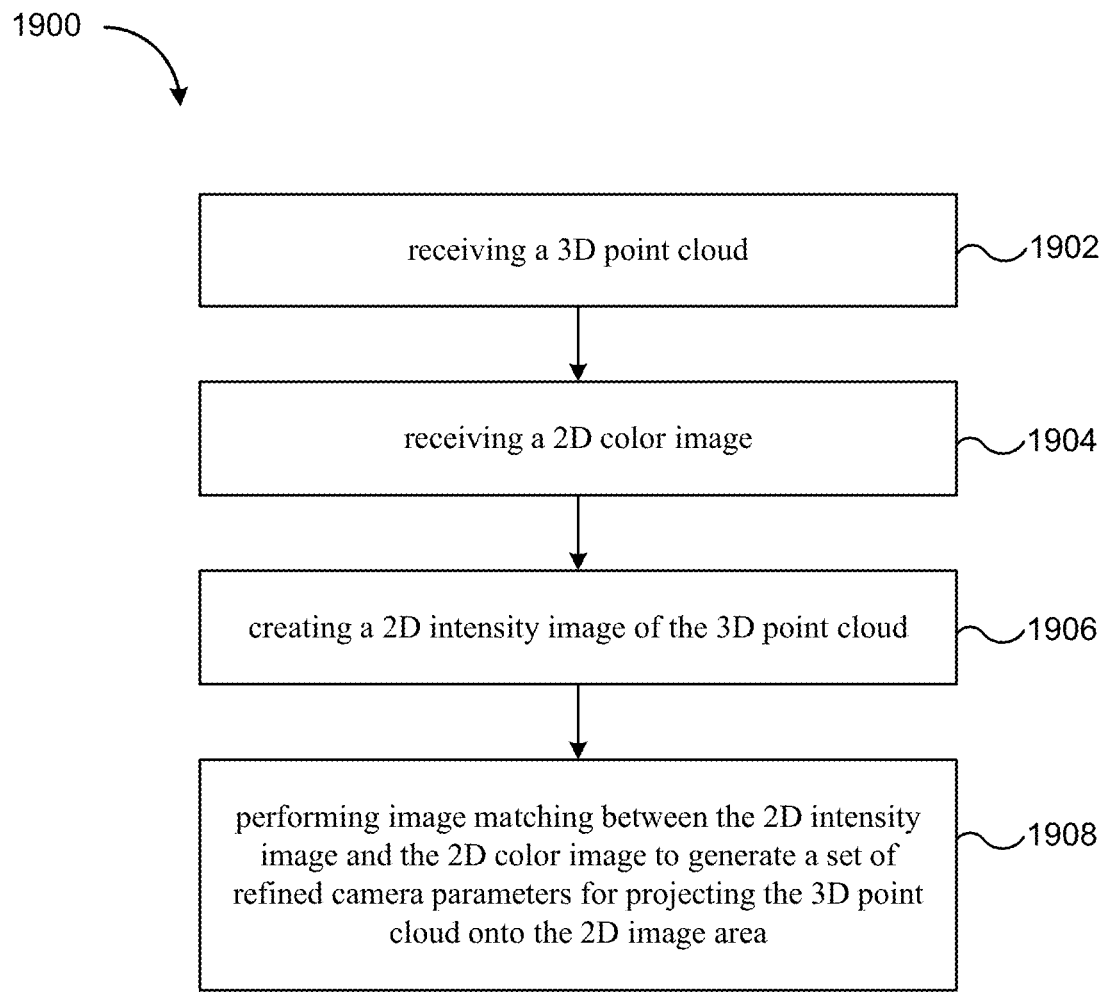
FIG. 19 shows a simplified flowchart illustrating a method of camera calibration with respect to a 3D imaging device according to an embodiment of the present invention.

FIG. 19 shows a simplified flowchart illustrating a method 1900 of camera calibration with respect to a 3D imaging device according to an embodiment of the present invention. The method 1900 includes, at 1902, receiving a 3D point cloud acquired by the 3D imaging device positioned at a first location. The 3D point cloud can include 3D coordinates and intensity data for a set of points representing surfaces of one or more objects. The method 1900 further includes, at 1904, receiving a 2D color image of the one or more objects acquired by a camera positioned at an approximately known second location and an approximately known orientation. The camera can have an approximately known set of intrinsic optical parameters.

The method 1900 further includes, at 1906, creating a 2D intensity image of the 3D point cloud using the intensity data by projecting the 3D point cloud onto a 2D image area from a view point of the second location based on the set of intrinsic optical parameters of the camera, the second location, and the orientation of the camera. The 2D image area can have a size that is the same as the size of the 2D color image. The method 1900 further includes, at 1908, performing image matching between the 2D intensity image and the 2D color image to generate a set of refined camera parameters for projecting the 3D point cloud onto the 2D image area.

Figure 20:
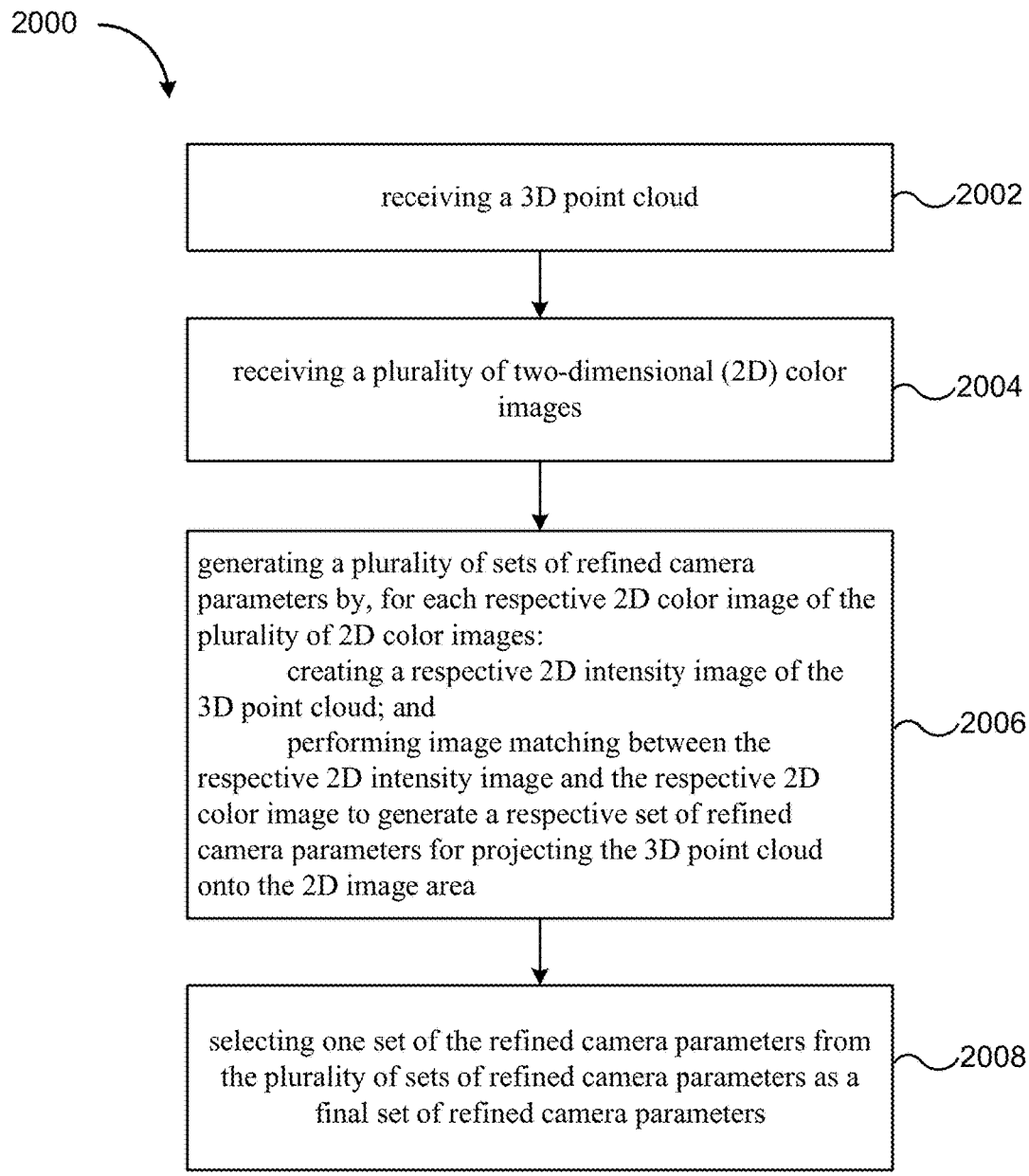
FIG. 20 shows a simplified flowchart illustrating a method of camera calibration with respect to a 3D imaging device according to another embodiment of the present invention.

FIG. 20 shows a simplified flowchart illustrating a method 2000 of camera calibration with respect to a 3D imaging device according to another embodiment of the present invention. The method 2000 includes, at 2002, receiving a 3D point cloud acquired by the 3D imaging device. The 3D point cloud can include 3D coordinates and intensity data for a set of points representing surfaces of one or more objects. The method 2000 further includes, at 2004, receiving a plurality of two-dimensional (2D) color images of the one or more objects acquired by a camera positioned at a plurality of corresponding locations and a plurality of corresponding orientations. The camera can have an approximately known set of intrinsic optical parameters.

The method 2000 further includes, at 2006, generating a plurality of sets of refined camera parameters by, for each respective 2D color image of the plurality of 2D color images: creating a respective 2D intensity image of the 3D point cloud using the intensity data by projecting the 3D point cloud onto a 2D image area from a view point of the camera based on a respective location and respective orientation, and the set of intrinsic optical parameters of the camera, the 2D image area having a size that is the same as the size of the 2D color image; and performing image matching between the respective 2D intensity image and the respective 2D color image to generate a respective set of refined camera parameters for projecting the 3D point cloud onto the 2D image area. The method 2000 further includes, at 2008, selecting one set of the refined camera parameters from the plurality of sets of refined camera parameters as a final set of refined camera parameters. In some embodiments, selecting the one set of the refined camera parameters is performed using a clustering algorithm, as described above.

Figure 21:
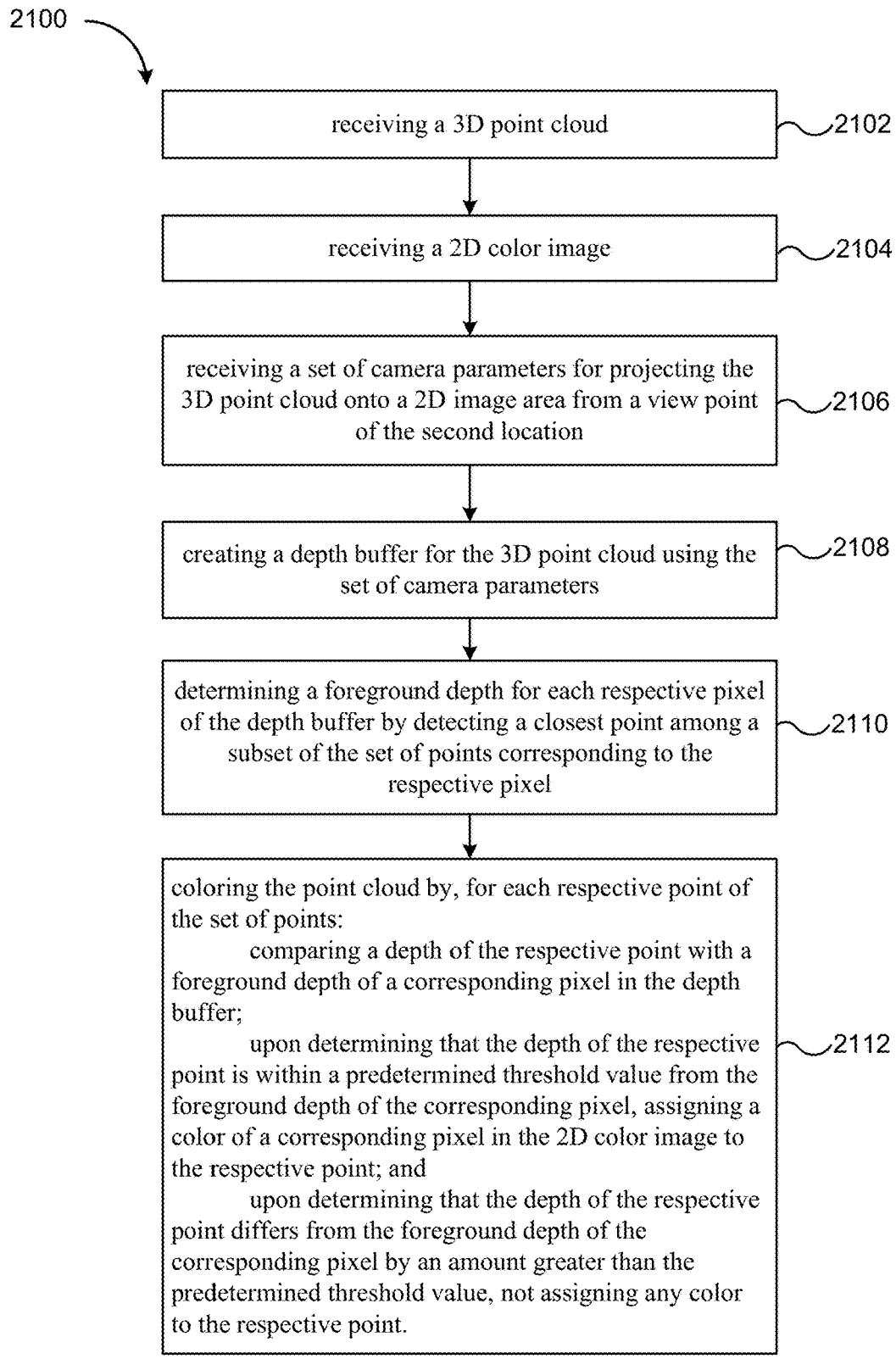
FIG. 21 shows a simplified flowchart illustrating a method of colorizing a 3D point cloud according to an embodiment of the present invention.

FIG. 21 shows a simplified flowchart illustrating a method 2100 of colorizing a 3D point cloud according to an embodiment of the present invention. The method 2100 includes, at 2102, receiving the 3D point cloud. The 3D point cloud can be acquired by a 3D imaging device positioned at a first location. The 3D point cloud can include 3D coordinates for a set of points representing surfaces of one or more objects. The method 2100 further includes, at 2104, receiving a 2D color image of the one or more objects acquired by a camera positioned at a second location different from the first location and having an orientation. The method 2100 further includes, at 2106, receiving a set of camera parameters for projecting the 3D point cloud onto a 2D image area from a view point of the second location. The 2D image area can have a size that is the same as the size of the 2D color image.

The method 1700 further includes, at 2108, creating a depth buffer for the 3D point cloud. The depth buffer can have an image area of a size that is the same as the size of the 2D color image and a pixel size that is the same as the pixel size of the 2D color image. The depth buffer can include depth data for the set of points in the 3D point cloud as the set of points are projected onto pixels of the depth buffer using the set of camera parameters. The method 2100 further includes, at 2110, determining a foreground depth for each respective pixel of the depth buffer by detecting a closest point among a subset of the set of points corresponding to the respective pixel.

The method 2100 further includes, at 2112, coloring the point cloud by, for each respective point of the set of points: comparing a depth of the respective point with a foreground depth of a corresponding pixel in the depth buffer; upon determining that the depth of the respective point is within a predetermined threshold value from the foreground depth of the corresponding pixel, assigning a color of a corresponding pixel in the 2D color image to the respective point; and upon determining that the depth of the respective point differs from the foreground depth of the corresponding pixel by an amount greater than the predetermined threshold value, not assigning any color to the respective point.

It should be appreciated that the specific steps illustrated in each of FIGS. 5, 8, 13, 15, and 17-21 provide particular methods according to various embodiments of the present invention. Other sequences of steps may also be performed according to alternative embodiments. For example, alternative embodiments of the present invention may perform the steps outlined above in a different order. Moreover, the individual steps illustrated in each of FIGS. 5, 8, 13, 15, and 17-20 may include multiple sub-steps that may be performed in various sequences as appropriate to the individual step. Furthermore, additional steps may be added or removed depending on the particular applications.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method of colorizing a three-dimensional (3D) point cloud, the method comprising:
receiving the 3D point cloud, the 3D point cloud acquired by a 3D imaging device positioned at a first location and including 3D coordinates and intensity data for a set of points representing surfaces of one or more objects;
receiving a two-dimensional (2D) color image of the one or more objects acquired by a camera positioned at an approximately known second location and an approximately known orientation, the camera having an approximately known set of intrinsic optical parameters;
creating a 2D intensity image of the 3D point cloud using the intensity data by projecting the 3D point cloud onto a 2D image area from a view point of the second location based on the set of intrinsic optical parameters, the second location, and the orientation of the camera, the 2D image area having a size that is same as a size of the 2D color image;

generating a set of refined camera parameters by matching the 2D intensity image and the 2D color image;
projecting the set of points of the 3D point cloud onto the 2D image area using the set of refined camera parameters;
creating a depth buffer for the 3D point cloud, the depth buffer having an image area of a size that is same as the size of the 2D color image and a pixel size that is same as a pixel size of the 2D color image, the depth buffer including depth data for the set of points in the 3D point cloud as the set of points are projected onto pixels of the depth buffer using the set of refined camera parameters;
determining a foreground depth for each respective pixel of the depth buffer by detecting a closest point among a subset of the set of points corresponding to the respective pixel; and
coloring the point cloud by, for each respective point of the set of points:
comparing a depth of the respective point with a foreground depth of a corresponding pixel in the depth buffer;
upon determining that the depth of the respective point is within a predetermined threshold value from the foreground depth of the corresponding pixel, assigning a color of a corresponding pixel in the 2D color image to the respective point; and
upon determining that the depth of the respective point differs from the foreground depth of the corresponding pixel by an amount greater than the predetermined threshold value, not assigning any color to the respective point.

2. The method of claim 1, wherein the set of intrinsic optical parameters of the camera includes one or more of a focal length, an optical center, a principal point, and distortion parameters.

3. The method of claim 1, wherein the camera is attached to the 3D imaging device, and the second location and the orientation of the camera are determined from mechanical design information of the camera with respect to the 3D imaging device.

4. The method of claim 1, wherein generating the set of refined camera parameters comprises:
detecting a first set of features in the 2D intensity image;
detecting a second set of features in the 2D color image; and
generating the set of refined camera parameters so that, when the set of refined camera parameters is applied to the 2D intensity image, the first set of features in the 2D intensity image matches with the second set of features in the 2D color image.

5. The method of claim 4, wherein each of the first set of features and the second set of features includes a set of edges.

6. The method of claim 4, wherein the set of refined camera parameters includes a translation parameter, a rotation parameter, and a scaling parameter.

7. The method of claim 1, wherein the 3D imaging device comprises a laser scanner.

8. The method of claim 1, wherein the camera comprises a thermal camera.

9. The method of claim 1, wherein the camera comprises a panoramic camera.

10. The method of claim 1, wherein the second location and the orientation of the camera are determined using one or more of a global navigation satellite system (GNSS), an inertial measurement unit (IMU), a compass, and a pressure sensor.

11. The method of claim 1, further comprising storing the 3D point cloud including the 3D coordinates and the intensity data for the set of points, and color data for a subset of the set of points that are assigned colors.

12. A method of camera calibration with respect to a three-dimensional (3D) imaging device, the method comprising:
receiving a 3D point cloud acquired by the 3D imaging device positioned at a first location and including 3D coordinates and intensity data for a set of points representing surfaces of one or more objects;
receiving a two-dimensional (2D) color image of the one or more objects acquired by a camera positioned at an approximately known second location and an approximately known orientation, the camera having an approximately known set of intrinsic optical parameters;
creating a 2D intensity image of the 3D point cloud using the intensity data by projecting the 3D point cloud onto a 2D image area from a view point of the second location based on the set of intrinsic optical parameters of the camera, the second location, and the orientation of the camera, the 2D image area having a size that is same as a size of the 2D color image; and
performing image matching between the 2D intensity image and the 2D color image to generate a set of refined camera parameters for projecting the 3D point cloud onto the 2D image area, wherein the set of refined camera parameters includes a translation parameter, a rotation parameter, and a scaling parameter.

13. The method of claim 12, wherein performing image matching comprises:
detecting a first set of edges of the one or more objects in the 2D intensity image to create a first edge image;
detecting a second set of edges of the one or more objects in the 2D color image to create a second edge image; and
estimating the translation parameter, the rotation parameter, and the scaling parameter such that, when applied to the first edge image, the first edge image matches with the second edge image.

14. The method of claim 12, wherein the set of intrinsic optical parameters of the camera includes one or more of a focal length, an optical center, a principal point, and distortion parameters.

15. A method of camera calibration with respect to a three-dimensional (3D) imaging device, the method comprising:
receiving a 3D point cloud acquired by the 3D imaging device, the 3D point cloud including 3D coordinates and intensity data for a set of points representing surfaces of one or more objects;
receiving a plurality of two-dimensional (2D) color images of the one or more objects acquired by a camera positioned at a plurality of corresponding locations and a plurality of corresponding orientations, the camera having an approximately known set of intrinsic optical parameters;
generating a plurality of sets of refined camera parameters by, for each respective 2D color image of the plurality of 2D color images:
creating a respective 2D intensity image of the 3D point cloud using the intensity data by projecting the 3D point cloud onto a 2D image area from a view point of the camera based on a respective location and respective orientation, and the set of intrinsic optical parameters of the camera, the 2D image area having a size that is same as a size of the 2D color image; and performing image matching between the respective 2D intensity image and the respective 2D color image to generate a respective set of refined camera parameters for projecting the 3D point cloud onto the 2D image area; and selecting one set of the refined camera parameters from the plurality of sets of refined camera parameters as a final set of refined camera parameters according to a predetermined criteria.

16. The method of claim 15, wherein each set of the plurality of sets of refined camera parameters includes a translation parameter, a rotation parameter, and a scaling parameter.

17. The method of claim 15, wherein the set of intrinsic optical parameters of the camera includes one or more of a focal length, an optical center, a principal point, and distortion parameters.

18. The method of claim 15, wherein selecting the one set of the refined camera parameters is performed using a clustering algorithm.

19. A method of colorizing a three-dimensional (3D) point cloud, the method comprising:

receiving the 3D point cloud, the 3D point cloud acquired by a 3D imaging device positioned at a first location and including 3D coordinates for a set of points representing surfaces of one or more objects;

receiving a two-dimensional (2D) color image of the one or more objects acquired by a camera positioned at a second location different from the first location and having an orientation;

receiving a set of camera parameters for projecting the 3D point cloud onto a 2D image area from a view point of the second location, the 2D image area having a size that is same as a size of the 2D color image;

projecting the set of points of the 3D point cloud onto the 2D image area using the set of camera parameters;

creating a depth buffer for the 3D point cloud, the depth buffer having an image area of a size that is same as the size of the 2D color image and a pixel size that is same as a pixel size of the 2D color image, the depth buffer including depth data for the set of points in the 3D point cloud as the set of points are projected onto pixels of the depth buffer using the set of camera parameters;

determining a foreground depth for each respective pixel of the depth buffer by detecting a closest point among a subset of the set of points corresponding to the respective pixel; and coloring the point cloud by, for each respective point of the set of points:

comparing a depth of the respective point with a foreground depth of a corresponding pixel in the depth buffer;

upon determining that the depth of the respective point is within a predetermined threshold value from the foreground depth of the corresponding pixel, assigning a color of a corresponding pixel in the 2D color image to the respective point; and upon determining that the depth of the respective point differs from the foreground depth of the corresponding pixel by an amount greater than the predetermined threshold value, not assigning any color to the respective point.

20. The method of claim 19, wherein creating the depth buffer, determining the foreground depth, and coloring the point cloud are performed using a graphics processing unit (GPU).

21. The method of claim 19, wherein determining the foreground depth is performed using a Mathematical Morphology algorithm.

22. The method of claim 19, wherein the 3D point cloud includes intensity data for the set of points, the camera has a set of intrinsic optical parameters, and the set of camera parameters is obtained by:

creating a 2D intensity image of the 3D point cloud using the intensity data by projecting the 3D point cloud onto a 2D image area from a view point of the second location based on the intrinsic optical parameters of the camera, the second location, and the orientation of the camera, the 2D image area having a size that is same as a size of the 2D color image; and performing image matching between the 2D intensity image and the 2D color image to generate the set of camera parameters.

* * * * *